United States Patent
Nosato et al.

(10) Patent No.: US 12,488,896 B2
(45) Date of Patent: Dec. 2, 2025

(54) METHOD AND SYSTEM FOR ENDOSCOPIC DIAGNOSIS SUPPORT

(71) Applicants: NATIONAL INSTITUTE OF ADVANCED INDUSTRIAL SCIENCE AND TECHNOLOGY, Tokyo (JP); UNIVERSITY OF TSUKUBA, Tsukuba (JP)

(72) Inventors: Hirokazu Nosato, Tsukuba (JP); Yuta Kochi, Tsukuba (JP); Hidenori Sakanashi, Tsukuba (JP); Masahiro Murakawa, Tsukuba (JP); Atsushi Ikeda, Tsukuba (JP)

(73) Assignees: NATIONAL INSTITUTE OF ADVANCED INDUSTRIAL SCIENCE AND TECHNOLOGY, Tokyo (JP); UNIVERSITY OF TSUKUBA, Ibaraki (JP)

( * ) Notice: Subject to any disclaimer, the term of this patent is extended or adjusted under 35 U.S.C. 154(b) by 363 days.

(21) Appl. No.: 18/256,083

(22) PCT Filed: Dec. 7, 2021

(86) PCT No.: PCT/JP2021/045003
§ 371 (c)(1),
(2) Date: Aug. 10, 2023

(87) PCT Pub. No.: WO2022/124315
PCT Pub. Date: Jun. 16, 2022

(65) Prior Publication Data
US 2024/0038391 A1    Feb. 1, 2024

(30) Foreign Application Priority Data
Dec. 8, 2020   (JP) .................. 2020-203765

(51) Int. Cl.
G06T 7/00    (2017.01)
A61B 1/00    (2006.01)
(Continued)

(52) U.S. Cl.
CPC ....... G16H 50/20 (2018.01); A61B 1/000096 (2022.02); A61B 1/05 (2013.01);
(Continued)

(58) Field of Classification Search
CPC ........ G16H 50/20; G16H 30/40; G16H 15/00; G16H 50/70; A61B 1/000096; A61B 1/05;
(Continued)

(56) References Cited

U.S. PATENT DOCUMENTS 9,538,907 B2   1/2017   Akimoto et al.
11,633,084 B2   4/2023   Hirasawa et al.
(Continued)

FOREIGN PATENT DOCUMENTS

CN   109146884 A   1/2019
JP   5771757 B2   9/2015
(Continued)

OTHER PUBLICATIONS

OpenVSLAM: A Versatile Visual SLAM Framework, Shinya Sumikura et al., Open Source Software Competition, MM'19, Oct. 21-25, 2019, Nice, France, pp. 2292-2295, English text, 4 pages.
(Continued)

*Primary Examiner* — Siamak Harandi
(74) *Attorney, Agent, or Firm* — Rankin, Hill & Clark LLP

(57) ABSTRACT

An endoscopic diagnosis support method whereby an examined area and an unexamined area can be clearly discriminated. After a preparatory step of an observation canvas is performed in advance, a frame marking step, a key point
(Continued)

calculation step, a preceding and following frame displacement amount calculation step, a preceding and following frame marking step are executed to thereby perform observation recording. In an image diagnosis support step IDS, support is performed such that the existence of a lesion is diagnosed in an organ on the basis of a plurality of position data marked with respect to a plurality of frames in the observation canvas data and an endoscopic image in the plural frames.

15 Claims, 21 Drawing Sheets

(51) Int. Cl.
  *A61B 1/05* (2006.01)
  *G06T 7/73* (2017.01)
  *G06V 10/44* (2022.01)
  *G06V 10/764* (2022.01)
  *G16H 30/40* (2018.01)
  *G16H 50/20* (2018.01)

(52) U.S. Cl.
  CPC .............. *G06T 7/0012* (2013.01); *G06T 7/73* (2017.01); *G06V 10/44* (2022.01); *G06V 10/764* (2022.01); *G16H 30/40* (2018.01); *G06T 2207/10068* (2013.01); *G06T 2207/20081* (2013.01); *G06T 2207/20084* (2013.01); *G06T 2207/30096* (2013.01); *G06V 2201/03* (2022.01)

(58) Field of Classification Search
  CPC ... A61B 1/000094; G06T 7/0012; G06T 7/73; G06T 2207/10068; G06T 2207/20081; G06T 2207/20084; G06T 2207/30096; G06T 7/00; G06V 10/44; G06V 10/764; G06V 2201/03; G06V 10/82; G06V 20/20; G06V 20/40; G06V 2201/031
  See application file for complete search history.

(56) References Cited

U.S. PATENT DOCUMENTS

| | | | |
|---|---|---|---|
| 11,690,494 | B2 | 7/2023 | Mori et al. |
| 2009/0275830 | A1* | 11/2009 | Falco .................. A61N 5/1049 |
| | | | 600/437 |
| 2017/0251159 | A1 | 8/2017 | Ho Duc et al. |
| 2018/0084970 | A1 | 3/2018 | Harada et al. |
| 2022/0095889 | A1 | 3/2022 | Sato |

FOREIGN PATENT DOCUMENTS

| | | | |
|---|---|---|---|
| JP | 2017-205343 | A | 11/2017 |
| JP | 2017-534322 | A | 11/2017 |
| JP | 2018-050890 | A | 4/2018 |
| JP | 2019-180966 | A | 10/2019 |
| JP | 2020-073081 | A | 5/2020 |
| JP | 6704095 | B1 | 6/2020 |

OTHER PUBLICATIONS

International Search Report, International Application No. PCT/JP2021/045003, Date of mailing: Feb. 8, 2022, 2 pages.

* cited by examiner

Fig. 9
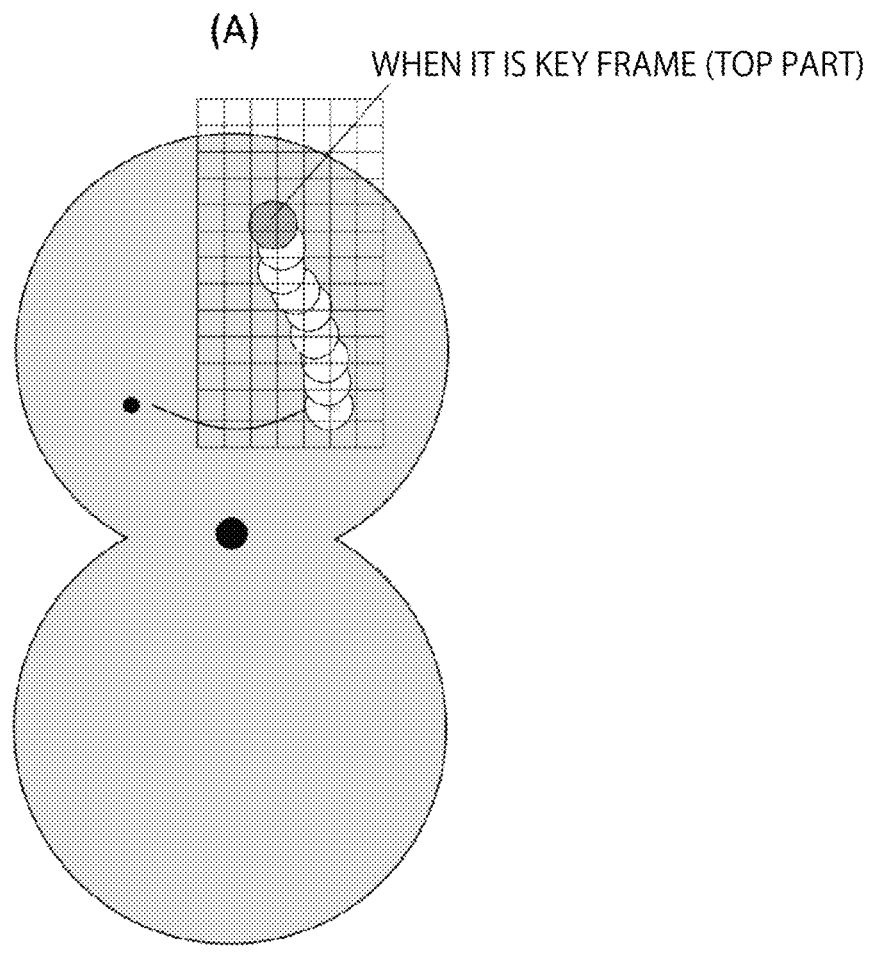
(A) WHEN IT IS KEY FRAME (TOP PART)
(B) 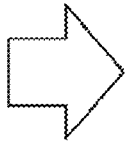 (C)

Fig. 10A

OBSERVATION CANVAS DATA
0: NOT MARKED
2: MARKED

OBSERVATION CANVAS

METHOD AND SYSTEM FOR ENDOSCOPIC DIAGNOSIS SUPPORT

TECHNICAL FIELD

The present invention relates to an endoscopic diagnosis support method and an endoscopic diagnosis support system targeted for an organ having a cavity such as a bladder.

BACKGROUND ART

For example, it is said that a two-years recurrence rate after a TURBT surgery is 50% in bladder cancer. This is because a small lesion or a flat lesion located around a raised lesion is not completely removed. This is mainly caused by "overlooking" in which the bladder to be observed is not observed and "failing to notice" in which observation is made but the lesion is not recognized at the time of examination. The accuracy of the examination actually depends on the skill and experience of an examiner. In order to reduce the recurrence rate, it is important to increase the accuracy of detecting the lesion in cystoscopy, and it is necessary to improve the diagnostic accuracy by compensating the skill and experience with the support by digitalization technology.

In view of the above, there are known, as techniques for recording the status in endoscopy, a system of performing recording by pasting an endoscopic image onto a model image of an organ on the basis of information of a position and a direction acquired by a sensor attached to a tip portion of an endoscope disclosed in JP5771757B (Patent Literature 1), a program of estimating a future state of a target part from a deterioration amount between map data generated by 3D texture mapping and historical map data on the basis of distance information or an image of an intracorporeal part derived from the endoscopic image disclosed in JP6704095B (Patent Literature 2), and a method for generating a panoramic map of a cavity of a target organ by connecting endoscopic images disclosed in JP2017-534322A (Patent Literature 3). There are known, as techniques for supporting image diagnosis by artificial intelligence, an endoscope observation support apparatus detecting and tracking a predetermined lesion on the basis of the endoscopic image disclosed in JP2019-180966A (Patent Literature 4), and an image diagnosis support apparatus assessing a denomination and a position of a lesion existing in a gastrointestinal endoscopic image and information of accuracy thereof by a convolutional neural network that performs training using lesions predetermined in a plurality of gastrointestinal tumor endoscopic images as training data disclosed in JP2020-73081A (Patent Literature 5). Furthermore, a self-position estimation technique in which a map is created from information of a camera or a sensor of a mobile body, and is used for estimating where you are in the map is disclosed in Non-Patent Literature 1.

CITATION LIST

Patent Literature

PTL 1: JP5771757B
PTL 2: JP6704095B
PTL 3: JP2017-534322A
PTL 4: JP2019-180966A
PTL 5: JP2020-73081A

Non-Patent Literature

NPL 1: Sumikura, S., Shibuya, M., & Sakurada, K.: OpenVSLAM: A Versatile Visual SLAM Framework. Proceedings of the 27th ACM International Conference on Multimedia: 2292-2295, 2019.

SUMMARY OF INVENTION

Technical Problem

In related-art endoscopy, a doctor as an operator determines a lesion by diagnosis based on direct observation of an inside of a target organ while operating an endoscope, taking an endoscopic image of a suspicious place and recording the image as an examination report. Surgery, medical treatment and the like are performed on the basis of the examination report, which is based on the premise that the inside of the target organ is examined thoroughly and where the taken image was imaged is correctly recorded. However, in the current endoscopic system, whether all parts of the target organ which should be observed are observed or not, and where the taken image was imaged are recorded in a report by relying on the memory or notes of the doctor at the time of examination, and accuracies thereof vary depending on the skill and experience of the doctor. As for the artificial intelligence, diagnostic accuracy thereof is generally improved depending on the quality and quantity of training data; however, collecting training data of medical images with good quality costs enormously. The quality of medical images requires that the image quality is good, and that the image is combined with accurate annotation information by the doctor. Therefore, it is indispensable to collect enormous images and to add accurate annotation information to each of images. However, in the medical images, there are examinations such as gastrointestinal endoscopy and X-ray included in items of medical examination in Japan, in which the number of examinations is relatively large, and examinations such as cystoscopy, in which both the number of examinations and the number of patients are an order of magnitude smaller than the gastrointestinal endoscopy and collecting images is difficult. Accordingly, even if there is artificial intelligence for supporting diagnosis which can discriminate the existence of the lesion in the image with high accuracy by preparing a large volume of medical images and annotation information for training, this artificial intelligence is incapable of being applied to examination of an organ in which collection of training data is difficult such as cystoscopy. Even when application is possible, it is difficult to reveal all lesions of a patient in examination and to correctly communicate the examination result as information used at the time of surgery unless where the acquired image was taken in the organ and whether the entire inside of the organ was imaged or not can be correctly recorded. In order to realize diagnosis support by the artificial intelligence with high accuracy in actual endoscopy, it is necessary to solve two problems that observation is correctly recorded and that highly accurate artificial intelligence is realized even when a sufficient volume of training data necessary for training of the artificial intelligence is not collected.

An object of the present invention is to provide an endoscopic diagnosis support method and an endoscopic diagnosis support system capable of clearly discriminating an examined area and an unexamined area.

In addition to the above object, another object of the present invention is to provide an endoscopic diagnosis support method and an endoscopic diagnosis support system capable of increasing diagnostic accuracy without newly increasing training data even when training data is small.

Solution to Problem

The present invention provides an endoscopic diagnosis support method for performing support when an imaging device provided at a tip portion of an endoscope is inserted into a cavity of an organ of a subject and the existence of a lesion in the organ is diagnosed by using a computer on the basis of a plurality of frames including an endoscopic image taken by the imaging device. In the present invention, the computer executes the following first step to the sixth step by an installed computer program.

In the first step, observation canvas data for an observation canvas of the endoscopic image of the cavity in the organ is prepared. As the observation canvas, a simulated unfolded observation canvas in which positions of one or more openings and a top portion (anatomic structures) in the cavity of the organ are generally specified, and one opening is disposed at the center can be used. The observation canvas data is made by converting the observation canvas into electronic data.

In the second step, a key frame containing at least one anatomical structure which can specify a position in the cavity of the organ in a frame is determined and key-frame position data of the key frame is marked in the observation canvas data. Here, the key frame corresponds to at least one anatomy (in a case of a bladder, two ureteral openings, the urethral opening, or the top portion where bubbles are accumulated) to be a reference point when determining a relative position in the cavity. The key-frame position data is data relating to the position of at least one anatomy to be the reference point on the observation canvas. Specifically, when the observation canvas is the simulated unfolded observation canvas, the key-frame position data is data relating to the position of at least one anatomy determined by position coordinates on the simulated unfolded observation canvas. Marking of the key-frame position data of the key frame means that position information and the frame number are stored in association with the observation canvas data.

In the third step, the key frame is set as the first preceding frame, and three or more key points respectively existing on a preceding frame and a following frame in a plurality of frames are determined to calculate coordinates of the key points in the endoscopic image. Here, the calculation of coordinates of the key points in the endoscopic image is performed by using image feature points used in the well-known self-position estimation technique disclosed in Non-Patent Literature 1.

In the fourth step, a displacement amount between the preceding frame and the following frame is calculated on the basis of the coordinates of the three or more key points in the endoscopic image. Here, the displacement amount includes directions and angles where three or more key points in the preceding frame move, and distances among three or more key points in the preceding frame and the following frame.

In the fifth step, determined position data of a plurality of following frames is marked in the observation canvas data on the basis of at least the displacement amount, the first key-frame position data which has been marked first in the second step, and the next key-frame position data which has been marked later in the second step. In this step, a plurality of temporary position data is used as temporary position data of the plural following frames until the next key-frame position data is determined, and when the next key-frame position data is determined, the determined position data of the following frames is marked so that the temporary position data of the plural following frames fits between the first key-frame position data and the next key-frame position data. Here, the determined position data includes absolute position information using the center of the observation canvas as an origin and the frame number. This is because relative intervals of plural following frames existing between two key frame positions are determined when the first key-frame position data and the next key-frame position data are determined. The temporary position data of the following frames includes relative position information with respect to the first key-frame position data and frame numbers. For example, the relative position information is formed by adding signs representing coordinate position data and a type determined by using a coordinate position of segments where one anatomical structure to be the key frame is located as a reference point in a matrix formed by aligning a plurality of segments having the same dimension and the same shape assumed on the simulated unfolded observation canvas. When such matrix is used, it is easy to draw relative position information sequentially on an unfolded view; therefore, it is possible to obtain an advantage that which part in the organ has been observed can be easily recorded without complicated processing such as joining observation images together or three-dimensional mapping. Then, when the determined position data is marked in the observation canvas data for the inner wall of the target organ, it is possible to clearly discriminate an examined area and an unexamined area; therefore, the inside of the target organ can be thoroughly observed, and where the taken image was obtained can be correctly recorded.

In the sixth step, support for image diagnosis of the existence of the lesion in the organ is performed on the basis of the plural position data marked in the observation canvas data and the endoscopic image in the plural frames in parallel with or after execution of the second step to the fifth step with respect to the plural frames.

For example, the sixth step can be realized by at least one of the following trained image diagnosis models. Specifically, the sixth step can be executed by using the trained image diagnosis model obtained by training data recorded in the endoscopic image database as training data. When the endoscopic image database is the endoscopic image database including image data with annotation information, augmented annotation information obtained by augmenting annotation information by using an annotation augmented model is included in the endoscopic image database, thereby increasing diagnostic accuracy without newly increasing training data even when training data is small.

As the annotation augmented model, it is preferable to use an annotation augmented model based on an autoencoder configured by an encoder and a decoder. The annotation augmented model is trained as follows. A feature extracted from an intermediate layer of the image diagnosis model, whereby a lesion endoscopic image recorded from the endoscopic image database is used as an input, is inputted into the encoder by using the image diagnosis model as a feature extractor. A set of annotation information corresponding to the lesion endoscopic images is also inputted into the encoder. Then, a latent variable outputted from the encoder and the feature are inversely calculated by a decoder to assume annotation augmented information. When such annotation augmented model is used, useful augmented annotation information can be newly obtained from the endoscopic images in the original endoscopic image database without newly increasing annotation information even when training data is small.

When creating the annotation augmented model, it is preferable to perform training so as to reduce cross entropy between annotation information inputted to the encoder and the augmented annotation information. Advantageously with this, an ambiguous annotation standard so as to reproduce annotation information of the original endoscopic database as much as possible can be learned. Further, ambiguity at an interface between the lesion and the ne reproduced also in augmented annotation information to be generated.

It is preferable that augmented annotation information is randomly augmented in the annotation augmented model. To randomly augment does not mean that all obtained augmented annotation information is adopted, but means that augmented annotation information randomly selected from the obtained augmented annotation information is adopted. With this, it is possible to obtain balanced augmented annotation information without increasing augmented annotation information more than necessary.

The endoscopic image database may further include an augmented data set containing augmented data and augmented annotation information obtained by augmenting data of the lesion endoscopic images recorded in the endoscopic image database by using a data augmentation technique. When the augmented data set is included in the endoscopic image database, training accuracy can be further increased with small data without newly increasing training data.

In the sixth step, diagnosis support may be performed by detecting an area where the possibility of a lesion is high in the endoscopic image and determining whether the area where the possibility of the lesion is high is the lesion or not by using the trained image diagnosis model obtained by training data recorded in the endoscopic image database as training data. The endoscopic image includes both a part assumed to be normal and a part assumed to be a lesion. Therefore, whether the normal part or the lesion is diagnosed by setting the area where the possibility of the lesion is high as a target to be assessed, thereby increasing diagnostic accuracy as compared with assessing the entire area.

In the above case, it is preferable to use the trained image diagnosis model that is configured to extract image features in all pixels from the endoscopic image, to specify an area where the possibility of the lesion is high from the endoscopic image, to calculate a lesion feature in the area where the possibility of the lesion is high by using the image features of a plurality of pixels located in the area where the possibility of the lesion is high, and to classify the area where the possibility of the lesion is high into the normal part and the lesion from the lesion feature. It is preferable that the trained image diagnosis model is configured by including a trained lesion area detection image diagnosis model, a binarization processing portion that creates a lesion candidate mask by performing binarization processing to a lesion accuracy map, an area limited feature calculation portion that calculates an area limited feature which is limited to the area where the possibility of the lesion is high on the basis of the image feature and the lesion candidate mask, a lesion candidate feature calculation portion that calculates a lesion candidate feature at the area where the possibility of the lesion is high by averaging the area limited features, and a lesion classification image diagnosis model that classifies the area where the possibility of the lesion is high into the normal part and the lesion on the basis of the lesion candidate feature. When such trained image diagnosis model is used, determination accuracy at the area where the possibility of the lesion is high can be increased. The image feature in this case is preferably obtained from an intermediate layer of the lesion area detection image diagnosis model.

It is also preferable to display, on a display screen of a display device, at least one of observation position display that displays a plurality of observed areas on a view resembling the observation canvas, lesion position display that displays the observed areas where lesions exist on the view resembling the observation canvas, diagnosis result display that displays malignancies and types of lesions in the observed areas where the lesions exist, and display of a chart of the subject. With this, the observation result and the diagnosis result can be checked on the display screen.

In another aspect, the present invention can be captured as an endoscopic diagnosis support system.

BRIEF DESCRIPTION OF DRAWINGS

FIGS. 9(A) to (C) explain that relative intervals among the plural following frames are determined when a next key-frame position data is determined.

FIG. 10 (B) illustrates a marking state of the observation canvas corresponding to observation canvas data.

DESCRIPTION OF EMBODIMENTS

Figure 1:
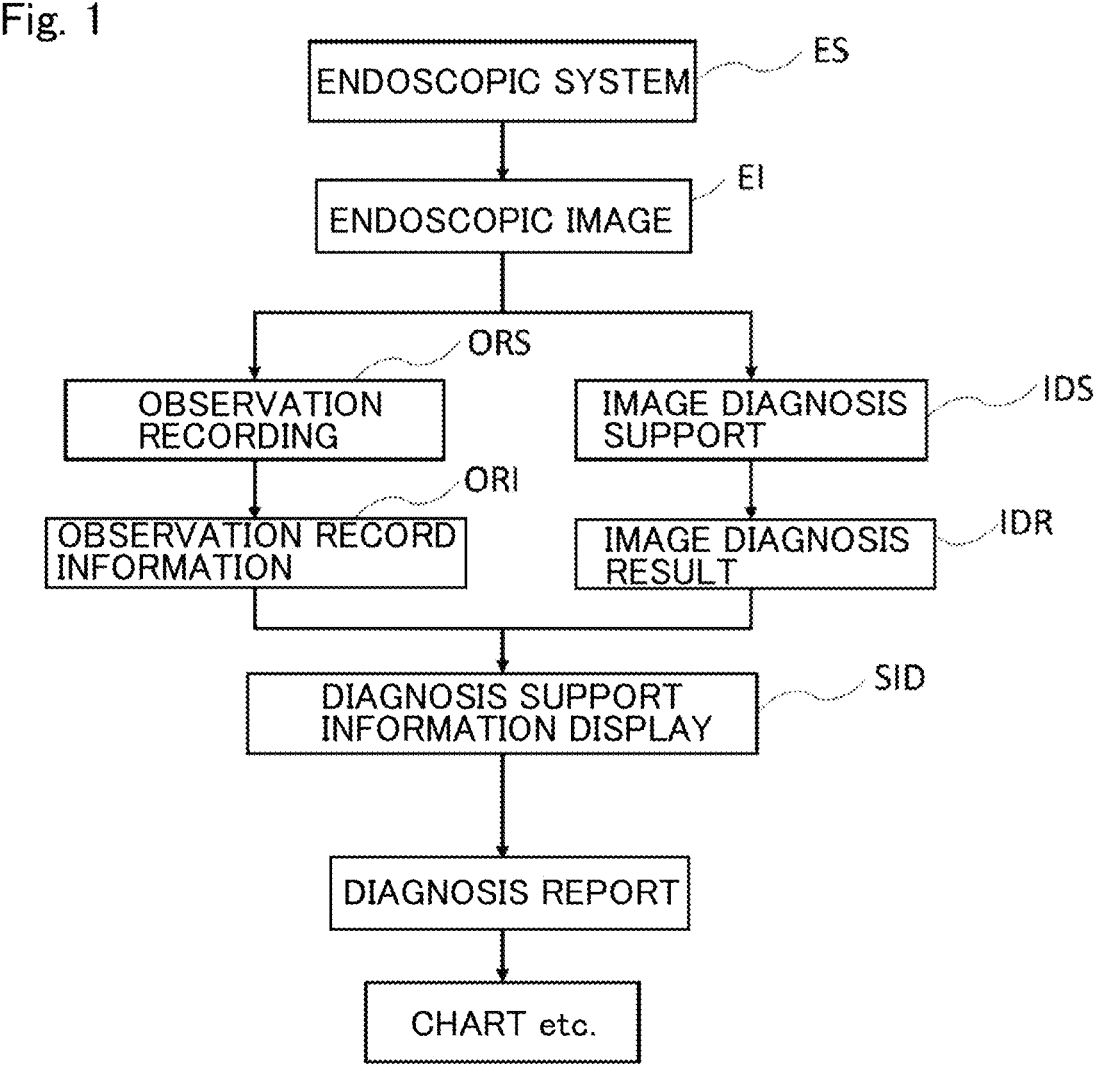
FIG. 1 is a diagram of a flowchart illustrating an outline when executing an endoscopic diagnosis support method according to the present invention by using a computer.

Hereinafter, an embodiment of an endoscopic diagnosis support method and an endoscopic diagnosis support system according to the present invention will be explained with reference to the drawings. In the endoscopic diagnosis support method and system according to the present invention, an imaging device mounted at a tip portion of an endoscope is inserted into a cavity of an organ of a subject to perform support for diagnosing the existence of a lesion in the organ by using a computer on the basis of a plurality of frames including an endoscopic image taken by the imaging device. FIG. 1 is a flowchart illustrating an outline of a plurality of steps executed when the endoscopic diagnosis support method of the present invention is realized by using the computer. As illustrated in FIG. 1, an endoscopic image EI obtained from an existing endoscopic system ES is processed at an observation recording step ORS and an image diagnosis support step IDS. In the observation recording step ORS, an observation record is obtained from the endoscopic image EI and stores the record in a storage means of the computer as observation record information ORI. In the image diagnosis support step IDS, support information used when diagnosing the existence of the lesion in the organ from the endoscopic image EI is stored in the storage means of the computer as an image diagnosis result IDR. A diagnosis support information display step portion SID realized by the computer outputs a diagnosis report including at least one of the observation record information ORI and the image diagnosis result IDR to a screen of a display device, a chart or the like. A format of the output is arbitrary. For example, the output may be performed by video displaying the image diagnosis result IDR on the screen.

[Observation Recording Step]

Figure 2:
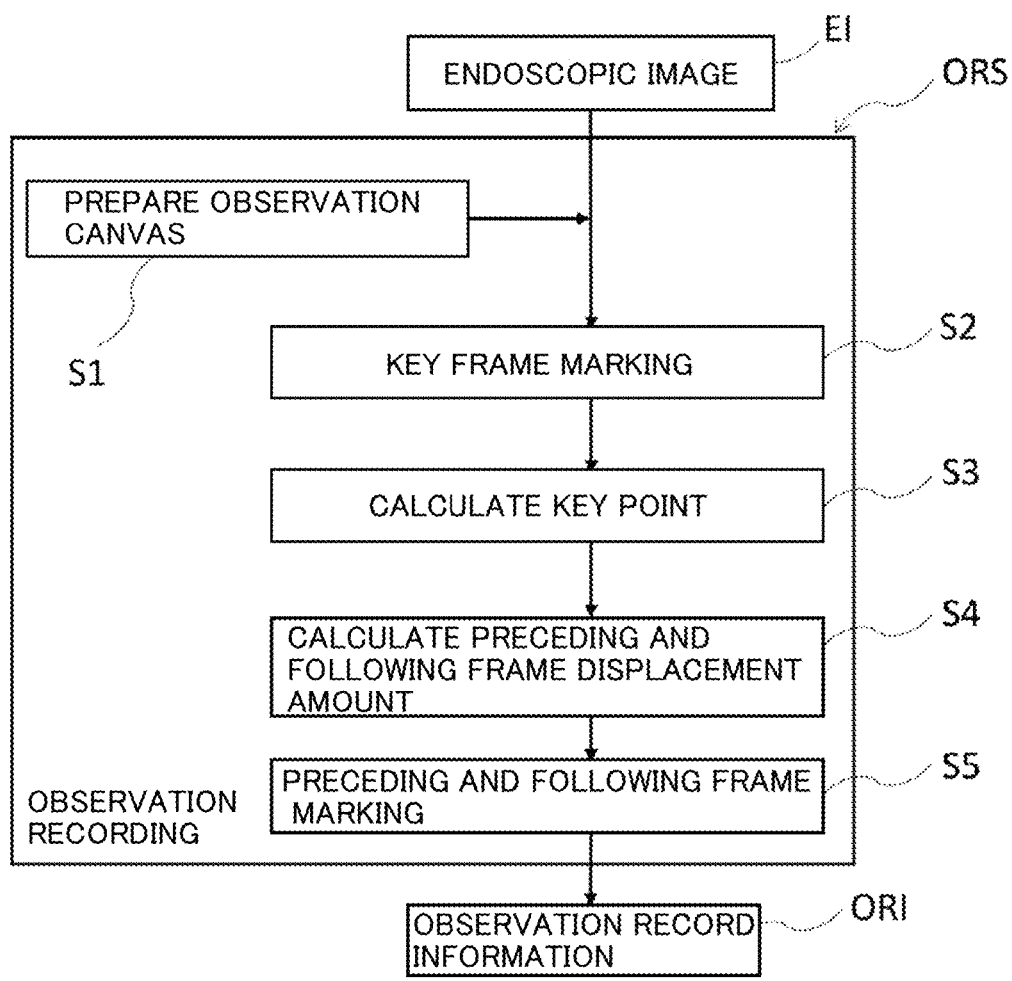
FIG. 2 is a diagram of a flowchart illustrating an algorithm of an observation recording step.

FIG. 2 illustrates a specific processing flow in the observation recording step ORS in the embodiment of the endoscopic support method according to the present invention. In the observation recording step ORS in the endoscopic diagnosis support method of the embodiment, a preparatory step (first step) S1 of an observation canvas is previously executed. Then a frame marking step (second step) S2, a key point calculation step (third step) S3, a preceding and following frame displacement amount calculation step (fourth step) S4, a preceding and following frame marking step (fifth step) S5 are executed to thereby perform observation recording. In the embodiment of the endoscopic diagnosis support system according to the present invention, a computer program for executing the above steps is installed in the computer and a plurality of means for executing respective steps are realized inside the computer. Moreover, the computer program for the endoscopic diagnosis support system is configured by including an algorithm for achieving the above steps.

In the preparatory step S1 (first step) of the observation canvas, observation canvas data about the observation canvas for an endoscopic image of a cavity in an organ is prepared in a memory of the computer as electronic data. The observation canvas data is made by converting the observation canvas into electronic data. As the observation canvas, a simulated unfolded observation canvas SOC in which positions of a plurality of openings and a top portion in the cavity of the organ are specified by common methods, and one opening is disposed at the center can be used.

Figure 3:
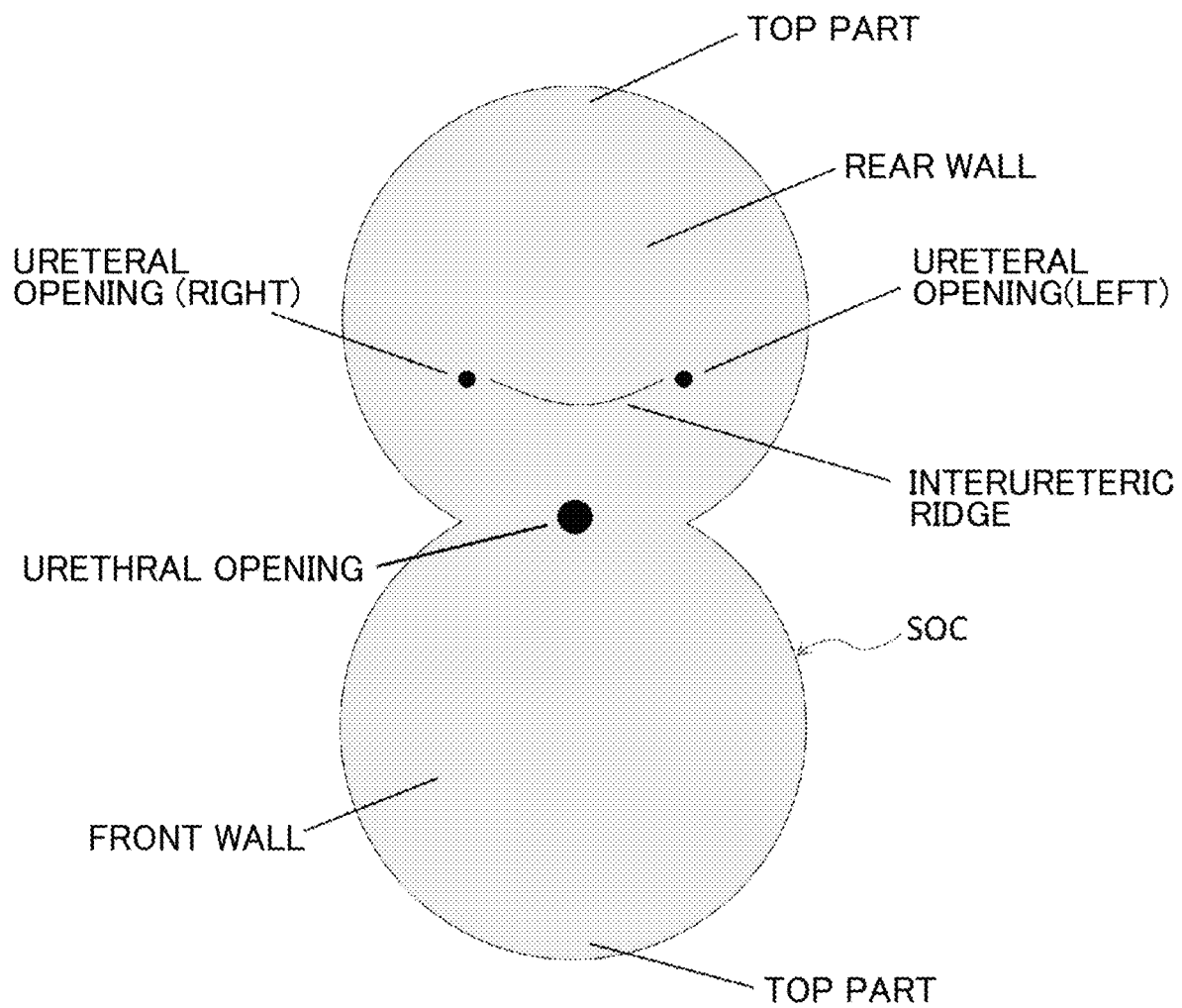
FIG. 3 illustrates an example observation canvas in a case where a bladder is an observation target.

FIG. 3 illustrate an example simulated unfolded observation canvas in a case where a bladder is used as the organ to be observed. As a virtual bladder corresponding to a bladder inner wall to be observed by a cystoscope, the bladder is assumed to be a sphere, and two semi-spheres of a front wall side (stomach) and a rear wall side (back) of the bladder are respectively prepared as circles. In this observation canvas, right and left ureteral openings as openings (for example, positions of ⅜ from below and right and left ¼ in an upper circle), an interureteric ridge between the openings, a urethral opening as an opening (center at a joint of two circles), and top parts (uppermost part of the upper circle, the lowermost part of a lower circle) are drawn.

Figure 4:
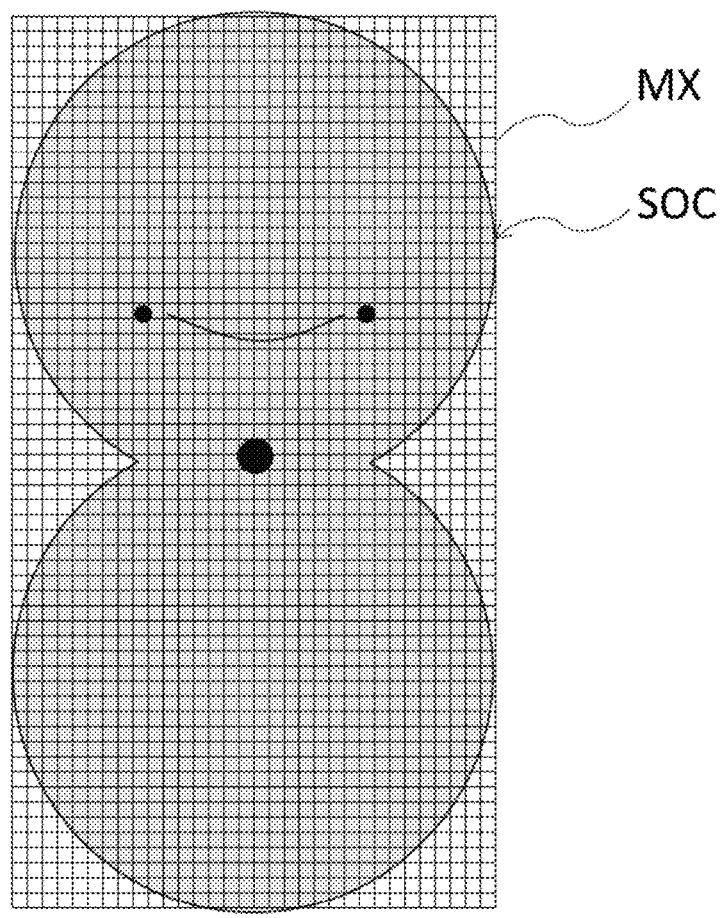
FIG. 4 illustrates a matrix-shaped observation canvas data.
Figure 5:
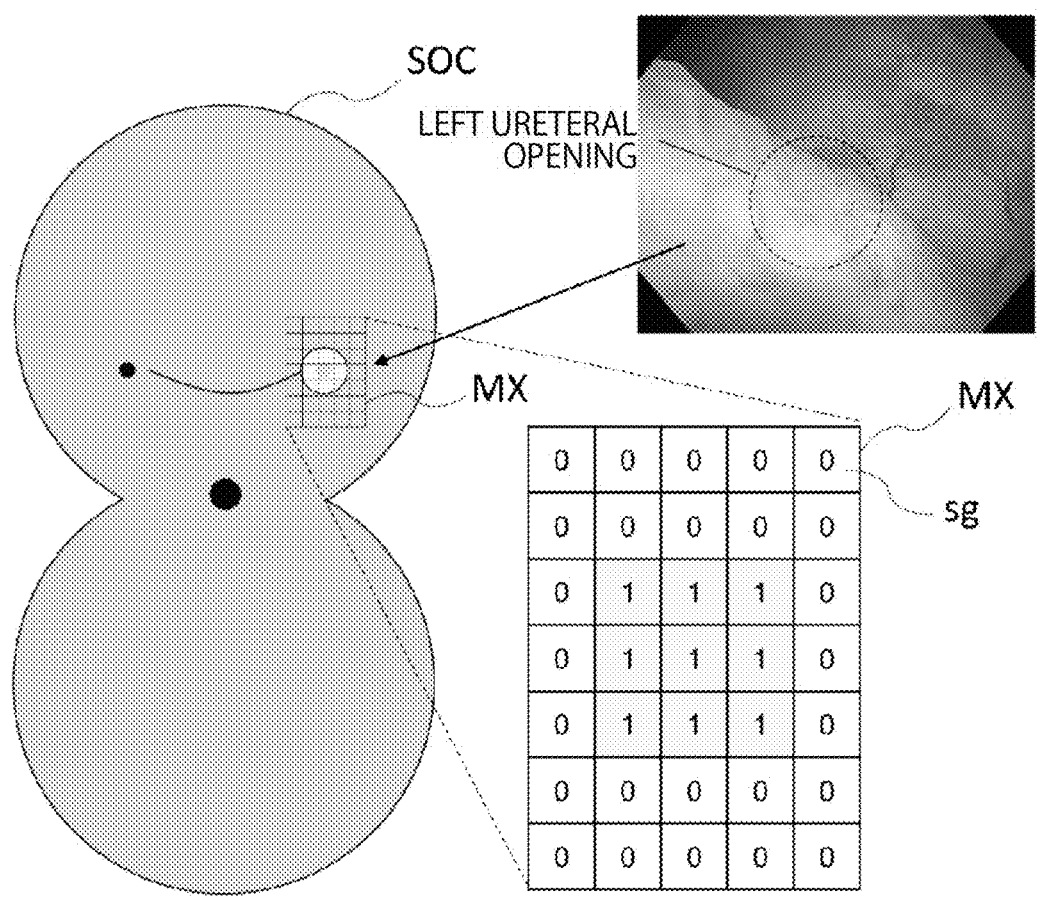
FIG. 5 illustrates temporary marking of the first key-frame position data on the observation canvas data.

FIG. 4 is a conceptual diagram in a case where the simulated unfolded observation canvas SOC of FIG. 3 is set as observation canvas data. In the example of FIG. 4, the observation canvas data is formed by adding signs representing the existence and a type of position data to a matrix MX formed by aligning a plurality of segments having the same dimension and the same shape (square segments in the example) assumed on the simulated unfolded observation canvas. It is also possible to use a simulated unfolded observation canvas in which two semi-spheres are aligned horizontally. It is further possible to align ellipses to be used as the simulated unfolded observation canvas, instead of semispheres. As illustrated in FIG. 5, a flag (0) indicating that unobserved or nonexistence of position data is set as an initial value in areas of all segments sg in the matrix MX of the observation canvas data. In respective segments sg, position information (coordinates) in a two-dimensional array, which the urethral opening is set as an origin in the simulated unfolded observation canvas SOC, is added individually. In the example of FIG. 5, a flag (1) indicating that the left ureteral opening was observed but not determined is added to corresponding segments.

In the frame marking step (second step) S2, a key frame containing at least one anatomical structure which can specify a position in a cavity of the organ in a frame is determined and key-frame position data of the key frame is marked in the observation canvas data. Here, the key frame is a frame in which at least one anatomical structure (in a case of a bladder, two ureteral openings, the urethral opening, or the top part where bubbles are accumulated) to be a reference point when determining a relative position in the cavity is imaged. Here, the position data is absolute position information with respect to the origin in the observation canvas data or relative position information with respect to the reference point and a frame number.

Figure 6:
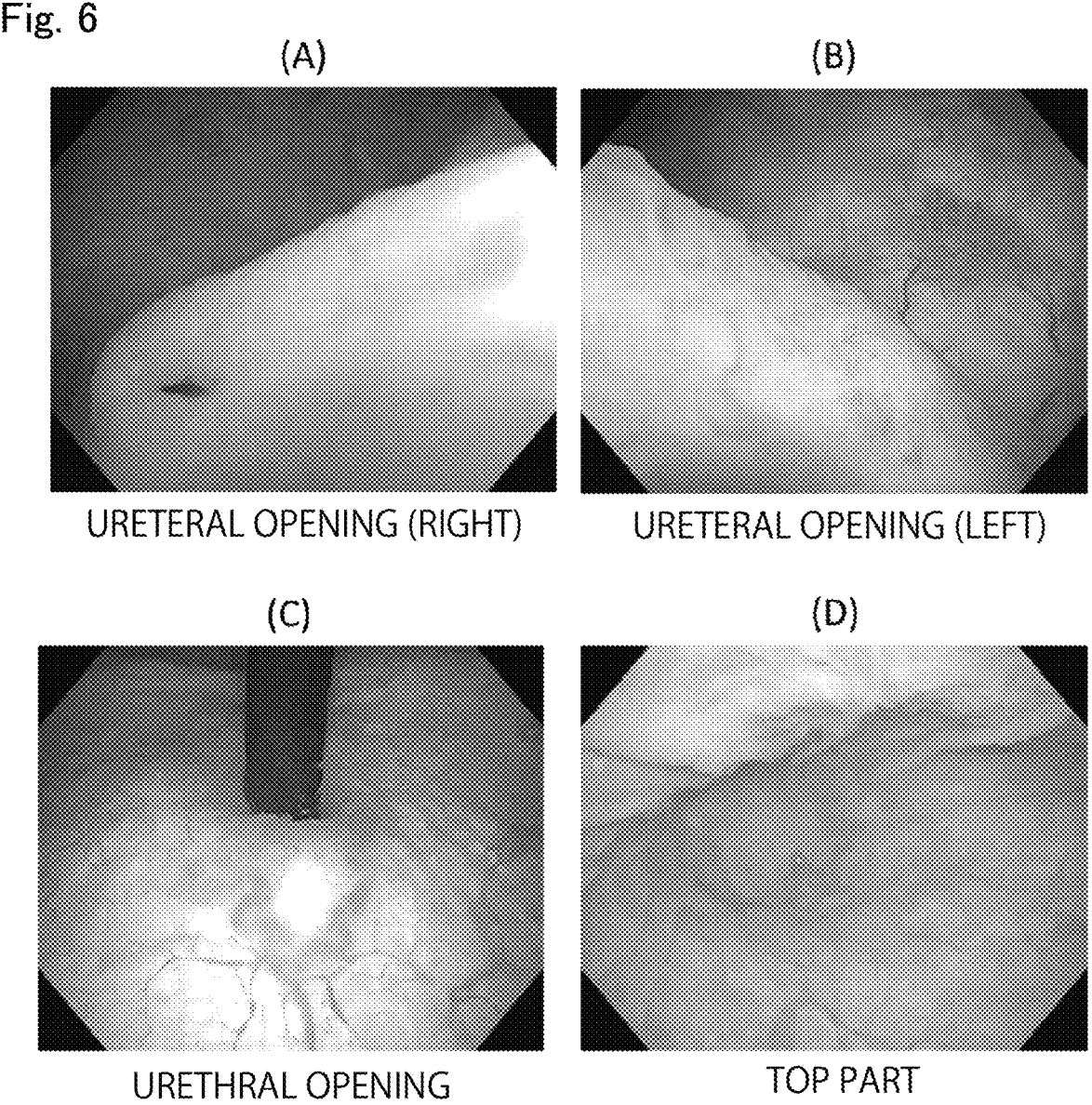
FIGS. 6(A) to (D) illustrate endoscopic images in which anatomical structures in a bladder to be key frames are captured.

FIGS. 6 (A) to (D) illustrate actual examples of the endoscopic image in frames in which the right and left ureteral openings, the urethral opening, and the top part where bubbles are accumulated are imaged. The key-frame position data relates to the position of at least one anatomical structure to be the reference point on the observation canvas. Specifically, when the observation canvas is the simulated unfolded observation canvas, the key-frame position data relates to the position of at least one anatomical structure determined by position coordinates on the simulated unfolded observation canvas. Marking of the key-frame position data of the key frame means that position information (coordinates of the segments sg) and the frame number of the image are stored in association with the observation canvas data.

For example, the frame, in which any of the right and left ureteral opening is captured in the frame images taken by the cystoscope illustrated in FIG. 6, is determined as a start key frame, and marking is performed to a corresponding area on the observation canvas as a start key frame position [coordinates of segments sg to which the flags (1) in FIG. 5 are added]. Here, marking means that flags in the corresponding area (segments) on the observation canvas are made to be the flag (1) indicating that an observed candidate, and position information thereof is associated with the frame image as illustrated in FIG. 5. In the example of FIG. 5, the initial value [flag (1)] in the area to which marking is performed is given to segments included in a circle with a size of 1/10 of the circle of the observation canvas as a measure of the size with which the circle surely comes into a visual field at the time of observation by the cystoscope.

In the key point calculation step (third step) S3, the start key frame is set as the first preceding frame, and three or more key points respectively existing on the preceding frame and the following frame in a plurality of frames are determined to calculate coordinates of the key points in the endoscopic image. Here, the key point corresponds to a pixel indicating the same place on an organ inner wall imaged in continuous preceding and following frames. The calculation of coordinates of the key points in the endoscopic image can be performed by using image feature points used by well-known self-position estimation technique disclosed in Visual SLAM (Simultaneous Localization and Mapping: mapping and localization/self-position estimation) applied to autonomous driving or robot vision. Many distinctive portions imaged in the frames are recognized as feature points, and coordinates of the key point in the endoscopic image are calculated by using the feature points as common portions.

In the preceding and following frame displacement amount calculation step (fourth step) S4, a displacement amount between three or more key points in the preceding frame and three or more key points in the following frame is calculated on the basis of coordinates of the three or more key points in the endoscopic image. Here, the displacement amount includes directions and angles where three or more key points in the preceding frame move, and respective distances of three or more key points between the preceding frame and the following frame. According to the displacement amount, relative position information of the following frame calculated from position information of the preceding frame marked on the observation canvas is calculated, the position information is associated with the frame image, and the following frame is marked as a subsequent following frame continued from the preceding frame. The observed candidate flag (1) is marked on the observation canvas while repeating the above process until the next key frame is detected.

Figure 7:
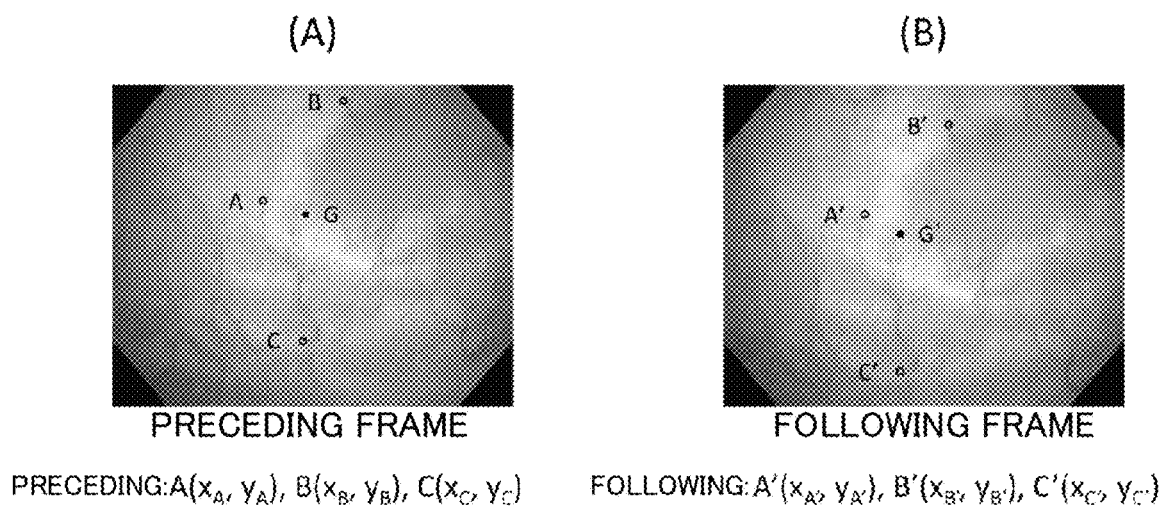
FIGS. 7(A) and (B) illustrate examples of key points calculated from a preceding frame and a following frame.

FIGS. 7 (A) and (B) illustrate the endoscopic image of the preceding frame and the following frame obtained by imaging the bladder inner wall. In this example, three points A, B, and C in the preceding frame correspond to three points A', B', and C' in the following frame. Here, when coordinates of three points A, B, and C are defined as A $(x_A, y_A)$, B $(x_B, y_B)$, and C $(x_C, y_C)$, and coordinates of three points A', B', and C' defined as A'$(x_A', y_A')$, B' $(x_B', y_B')$, and C' $(x_C', y_C')$, the movement distance and direction in which the three points move between the preceding and following frames can be calculated as a vector of a difference (G', −G) between a barycenter G of three points A, B, and C in the preceding frame and a barycenter G' of three points A', B', and C' in the following frame calculated by a formula (1) of the barycenter G below.

[Formula 1]

$$G = \left(\frac{x_A + x_B + x_C}{3}, \frac{y_A + y_B + y_C}{3}\right) \vec{G} = G' - G \quad (1)$$

The displacement in size from the preceding frame to the following frame can be calculated by a difference between averages of distances from three points to the barycenter as shown in the following formula (2).

[Formula 2]

$$\frac{\left(\overrightarrow{G'A'} - \overrightarrow{GA}\right) + \left(\overrightarrow{G'B'} - \overrightarrow{GB}\right) + \left(\overrightarrow{G'C'} - \overrightarrow{GC}\right)}{3} \quad (2)$$

Furthermore, the rotation can be calculated from an average of angles made by vectors from three points to the barycenter as shown in the following formula (3).

[Formula 3]

$$\cos\theta_A = \frac{\overrightarrow{GA} \cdot \overrightarrow{G'A'}}{|\overrightarrow{GA}||\overrightarrow{G'A'}|}, \cos\theta_B = \frac{\overrightarrow{GB} \cdot \overrightarrow{G'B'}}{|\overrightarrow{GB}||\overrightarrow{G'B'}|}, \cos\theta_C = \frac{\overrightarrow{GC} \cdot \overrightarrow{G'C'}}{|\overrightarrow{GC}||\overrightarrow{G'C'}|} \quad (3)$$

Figure 8:
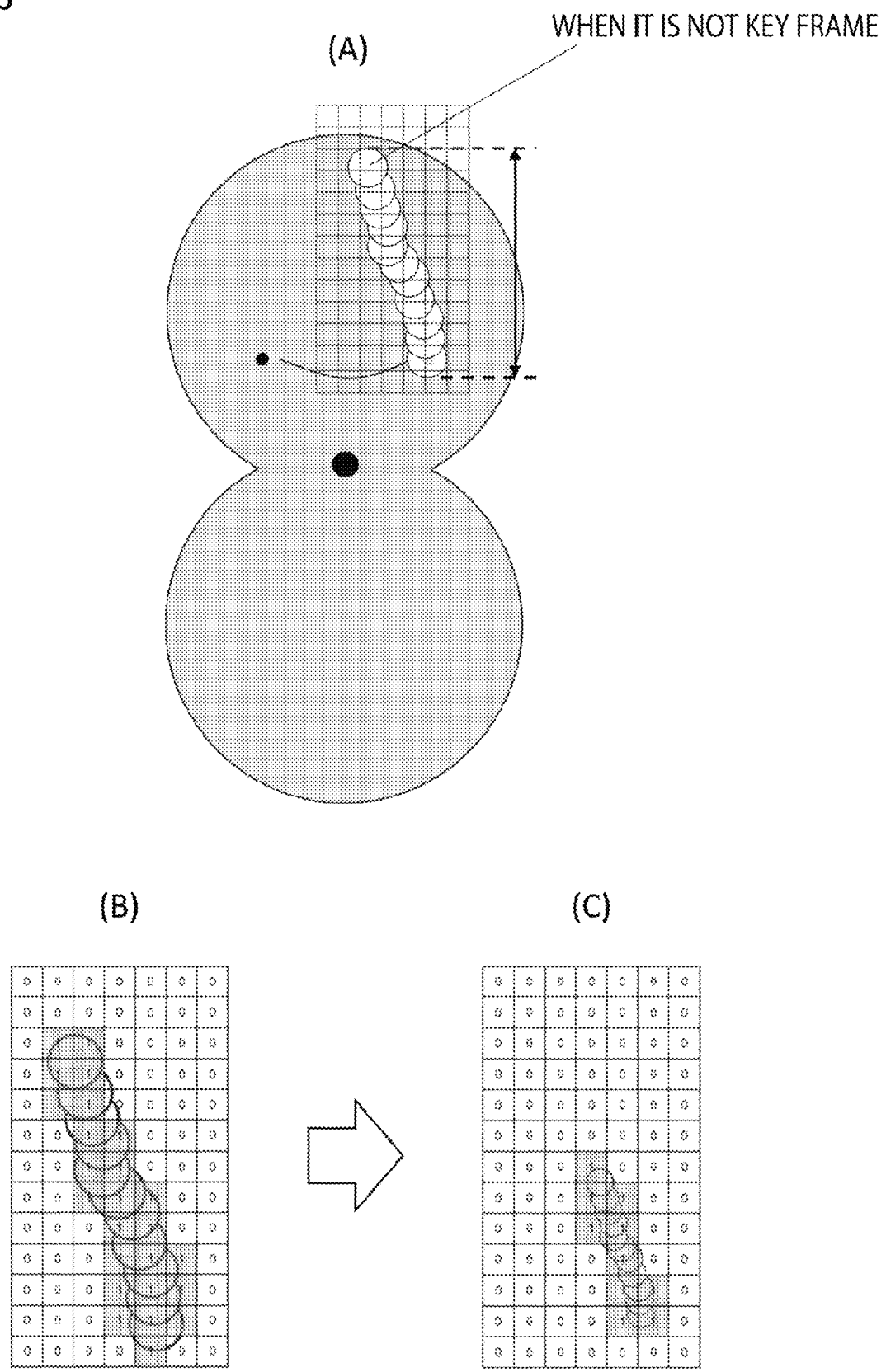
FIGS. 8(A) to (C) explain examples of temporary marking of position data of a plurality of following frames.

In the preceding and following frame marking step (fifth step) S5, determined position data of a plurality of following frames is marked in the observation canvas data on the basis of at least the displacement amount, the first key-frame position data which has been marked first in the second step, and the next key-frame position data which has been marked next in the second step. As illustrated in FIGS. 8 (A) to (C), temporary position data of the plural following frames is marked as temporary position data of the plural following frames until the next key-frame position data is determined in this step. In FIGS. 8 (B) and (C), the flags in respective segments indicating relative positions of respective frames remain being the observed candidate (1). In a specific example of FIG. 8, when an area where the following frames which are not the key frame are marked overlaps with any of key frame areas on the observation canvas, it is determined that the frames do not reach the key frame yet, and relative positions of frames to which the observed candidate flag (1) is added on the observation canvas are corrected so that the marking area size and the movement distance becomes ½ in relative information from the start key frame which has been marked until then. Moreover, a coefficient of the calculation formula of the movement distance and the area size are made to ½, thereby freeing the space in the observation canvas so as to continue the marking step after that. Here, the coefficient of "½" is expediently determined for preventing the plural following frames as the observed candidates from going out of the matrix, and is not limited to this value.

Then, as illustrated in FIGS. 9 (A) to (C), when the next key-frame position data (position data of the top part) is determined relative positions of the plural temporary following frames are adjusted so that the position data of the temporary (as observed candidates) following frames fits between the first key-frame position data (position data of the left ureteral opening) and the next key-frame position data, and marking of position data of the following frames is determined. When the first key frame position data and the next key frame position data are determined, relative positions of the plural following frames existing between the two key-frame positions are determined and absolute positions thereof are determined. As illustrated in FIGS. 9 (B) and (C), marking information of the continuous plural frames from the first key frame to the next key frame is corrected so as to be arranged between the key frames on the observation canvas, and flags of segments corresponding to absolute positions on the observation canvas are changed from the observed candidates (1) to observed (2) for determining the absolute positions. In the embodiment, position data of respective frames, of which observation is determined, includes absolute position information (coordinates) of plural segments sg of observed positions and frame numbers. The absolute position information is represented by coordinates to be determined by a row and a column in an array using the urethral opening as an origin on the matrix MX formed by aligning the plural segments sg having the same dimension and the same shape assumed on the simulated unfolded observation canvas in the embodiment.

Figure 10A:
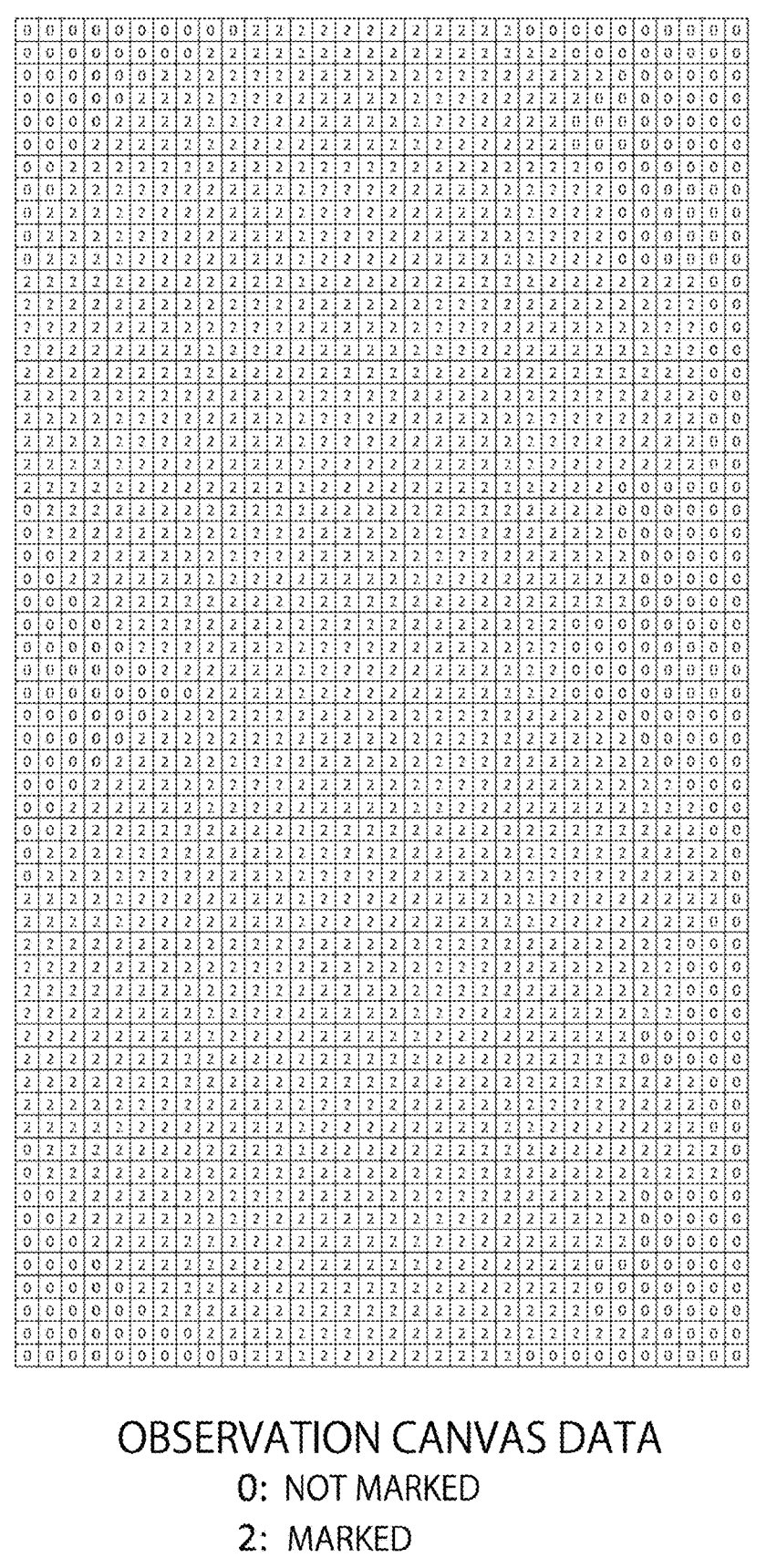
Figure 10B:
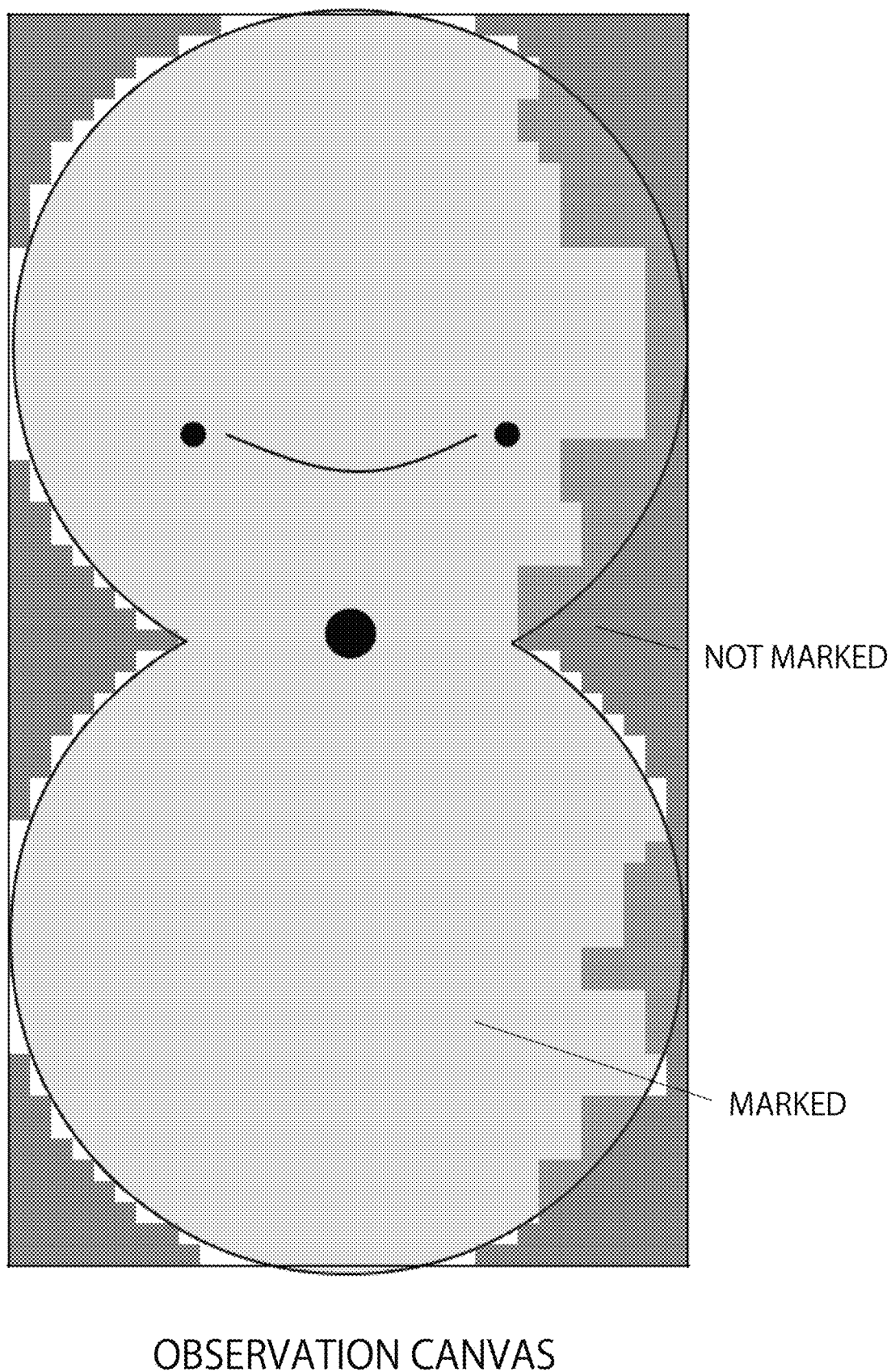
FIG. 10 (A) illustrates example observation canvas data.

When the above second step to the fifth step are repeated while changing the position of the endoscope with respect to the organ inner wall, flags in the plural segments on the observation canvas data become either the flag (0) indicating that marking has not been performed or the flag (2) indicating that marking has been performed as illustrated in FIG. 10 (A). Consequently, when areas in the observation canvas are classified by colors and displayed so that areas of plural segments of the flag (0) are displayed in black and areas of plural segments of the flag (2) are displayed in gray as illustrated in FIG. 10 (B), the existence and positions of areas not being observed by the endoscope (areas in gray) can be clearly shown.

Concerning frames determined to have the possibility of the lesion in a later-described image diagnosis support step (sixth step), imaging positions of frames including the lesion can be specified by using absolute position information of the segments corresponding to respective frames and frame numbers in the preceding and following frame marking step (fifth step) S5.

Accordingly, in a case where subsequent detailed examination or a surgery is performed, an accurate position of the lesion can be given. [Image Diagnosis Support Step (Sixth Step)]

The image diagnosis support step IDS (sixth step) illustrated in FIG. 1 is executed in parallel with execution of the second step to the fifth step with respect to the plural frames, which performs support for image diagnosis of the existence of the lesion in the organ on the basis of plural position data marked in the observation canvas data and the endoscopic image in the plural frames. However, existence of the lesion in the organ may be diagnosed on the basis of the plural position data marked on the observation canvas data and the endoscopic image in the plural frames after the second step to the fifth step are executed.

In the image diagnosis support step IDS (sixth step) illustrated in FIG. 1, image diagnosis support performed by using a trained image diagnosis model as follows. The trained image diagnosis model is realized in a computer and configures so-called artificial intelligence together with a database.

[Image Diagnosis Support System Using Trained Image Diagnosis Model]

Figure 11:
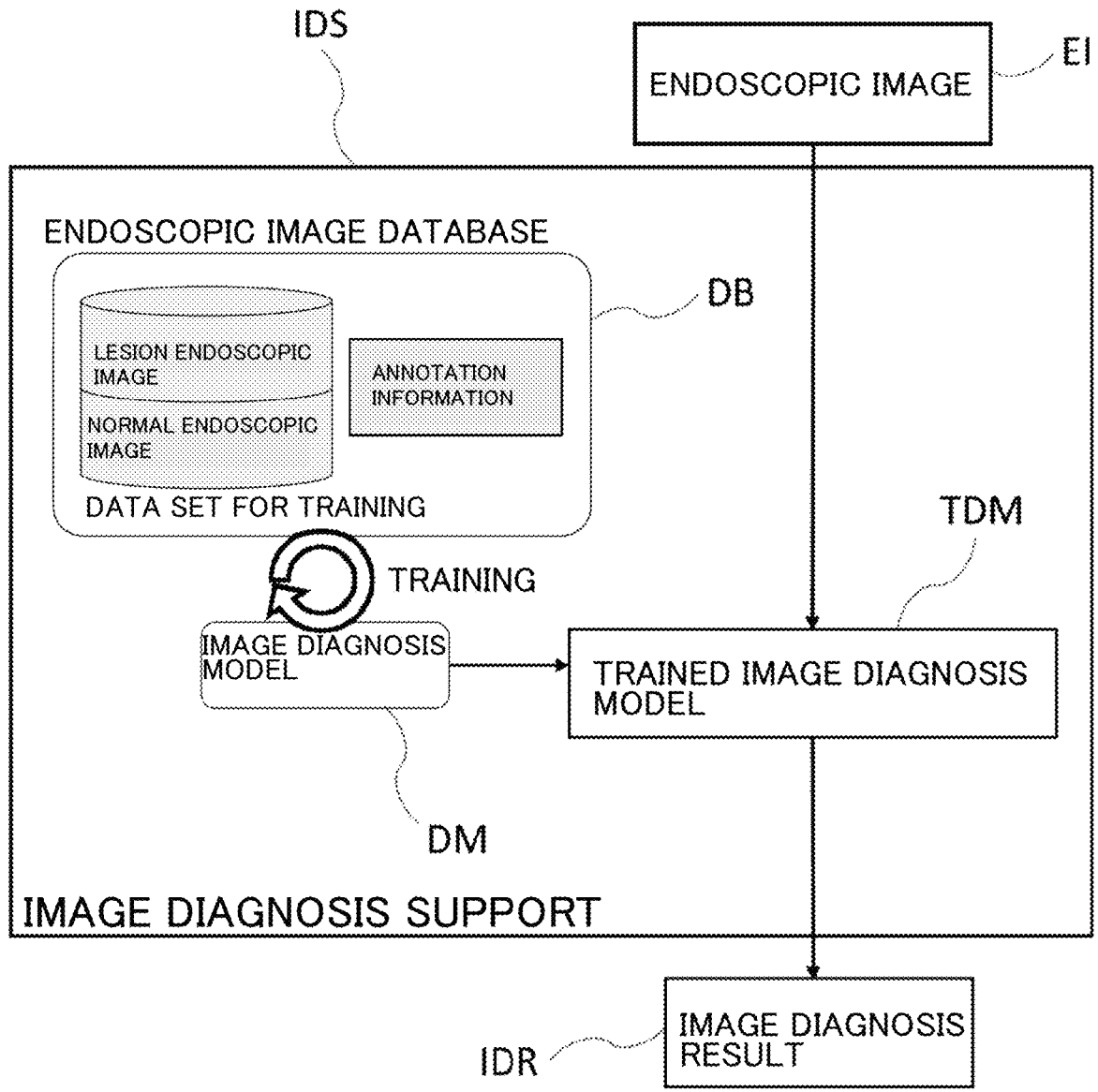
FIG. 11 is a diagram illustrating a basic configuration of an image diagnosis support system.

As illustrated in FIG. 11, the image diagnosis support IDS (sixth step) can be realized by the image diagnosis support system having the artificial intelligence using a trained image diagnosis model TDM generated by an image diagnosis model DM performing training by using data recorded in an endoscopic image database DB as training data. In the example of FIG. 11, the endoscopic image database DB records normal endoscopic image data, lesion endoscopic image data including the lesion, and annotation information data indicating information representing whether the lesion is included in the image or not, which is presented by a doctor. The sixth step (support system) is realized for observing the endoscopic image EI by using the trained image diagnosis model TDM obtained by training the image diagnosis model DM by using these data. In general, deep learning models used for image classification or object detection such as GoogleNet, Inception model, U-Net, ResNet, YOLO, SSD, and the like can be used as the image diagnosis model. The diagnostic accuracy of the artificial intelligence is improved depending on quality and quantity of training data. In order to collect training data of medical images with good quality, it is preferable that not only good image quality but accurate annotation information by the doctor is combined. Accordingly, normal and lesion endoscopic images and annotation information are recorded in the endoscopic image database in this example.

[Image Diagnosis Support by Annotation Augmentation]

There are many examinations such as cystoscopy, in which both the number of examinations and the number of patients are an order of magnitude smaller than a gastrointestinal endoscopic examination and it is difficult to collect examination images to be targets for diagnosis support as training data. Therefore, even when a large quantity of medical images and annotation information are collected for training to thereby create artificial intelligence for diagnosis support which can discriminate the existence of the lesion in the image with high accuracy, it is difficult to directly apply the artificial intelligence for diagnosis support to examinations for organs or cases, such as cystoscopy, in which collecting training data is difficult. In order to realize the image diagnosis support by the highly accurate artificial intelligence in the actual examination, the above problem have to be solved.

Figure 12:
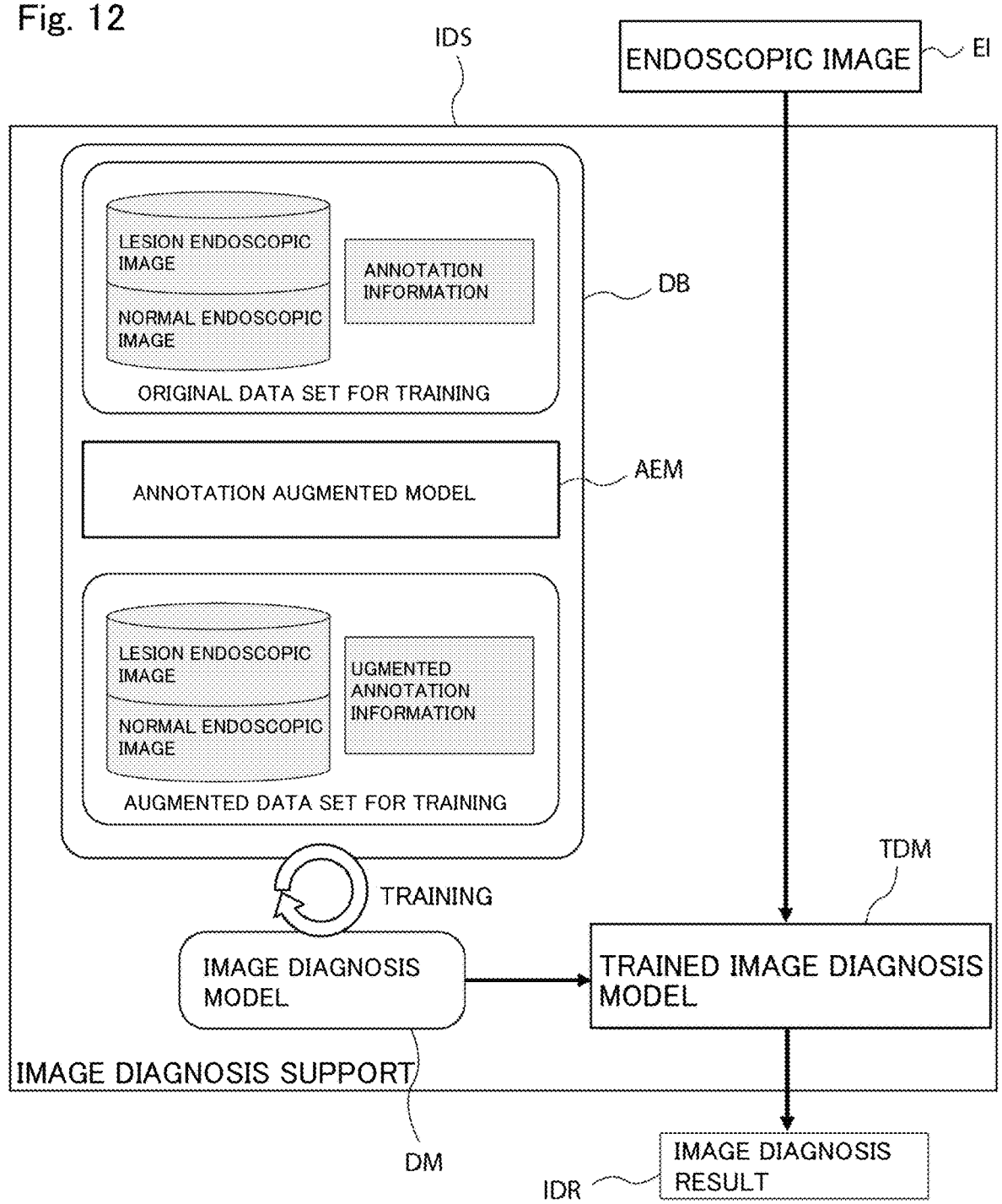
FIG. 12 is a diagram illustrating a configuration of an image diagnosis support system with annotation augmentation.
Figure 13:
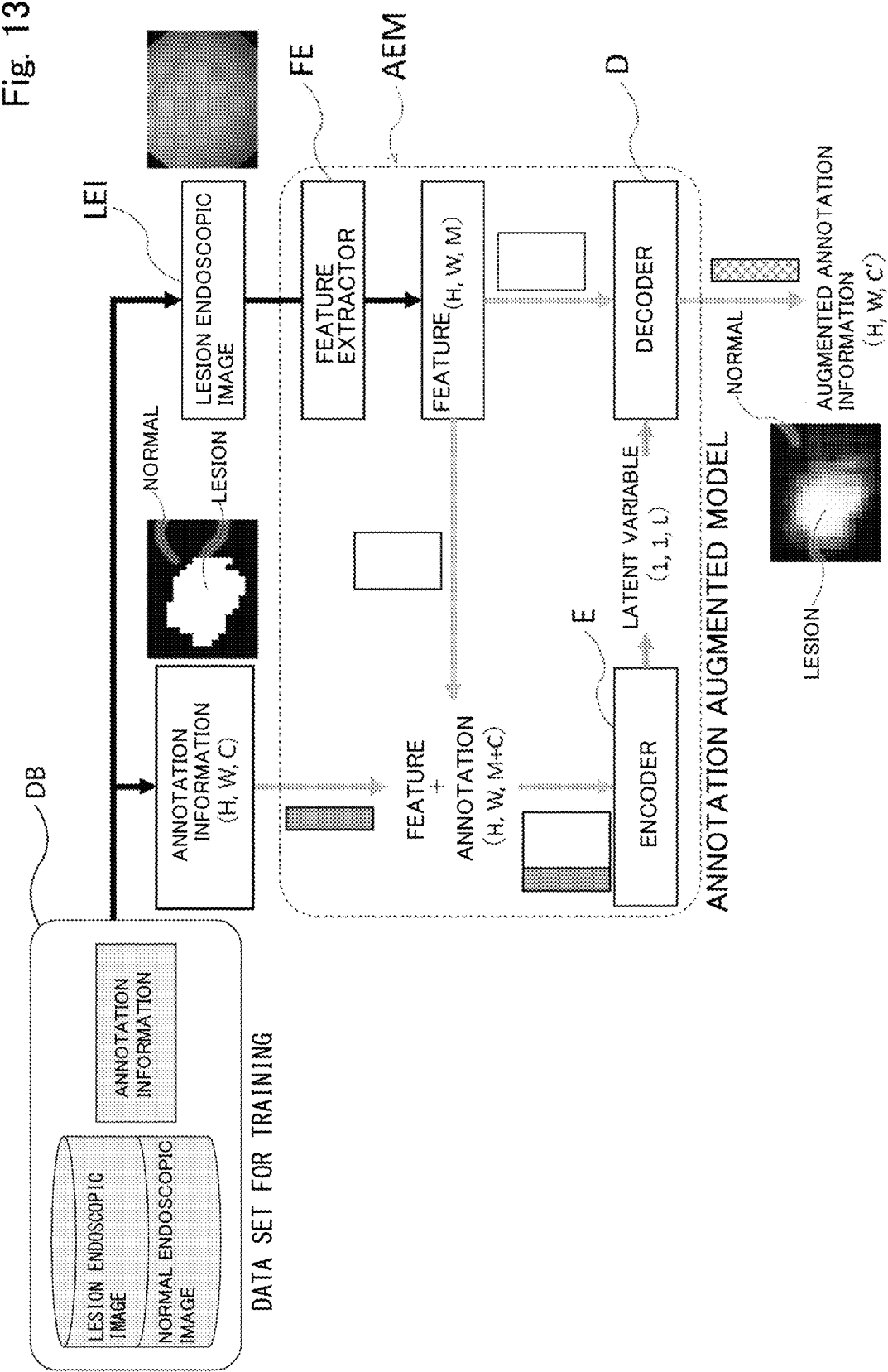
FIG. 13 is a diagram illustrating a flowchart for training an annotation information augmented model.

FIG. 12 illustrates a configuration of the image diagnosis support system performing the image diagnosis support step IDS (sixth step) using an annotation augmented model AEM in order to solve the above problem. In the system, the annotation augmented model AEM is provided in the endoscopic image database DB to create augmented annotation information. FIG. 13 illustrates a specific flow for training the annotation augmented model AEM. The annotation augmented model AEM illustrated in FIG. 13 is an annotation augmented model based on an autoencoder, which is configured by an encoder E and an encoder D. The autoencoder learns parameters so that input information and output information return to the same information when being decoded by the decoder D by using a latent variable obtained by compressing dimensions of input information once by the encoder E. The annotation augmented model calculates a feature (H, W, M) corresponding to each pixel from an intermediate layer of the image diagnosis model DM as follows. The image diagnosis model DM is used as a feature extractor FE, and a lesion endoscopic image LEI recorded in the endoscopic image database is inputted into the image diagnosis model. The, obtained feature (H, W, M) is inputted into the encoder E together with annotation information (H, W, C) corresponding to the lesion endoscopic image LEI. Then, a latent variable (1, 1, L) outputted from the encoder E and the feature (H, W, M) obtained from the feature extractor FE are inversely calculated by the decoder D to generate augmented annotation information (H, W, C') as a new annotation information. Here, the latent variable is a variable affecting interpretation of relation between variables, which is, for example, a variable affecting the habit or the like in an annotation operation with respect to the endoscopic images in the endoscopic image database. The feature "H" corresponds to "Feature Map Height", which is a feature in a height direction of a pixel array in a feature map of a convolutional neural network. "W" corresponds to "Feature Map Width", which is a feature in a width direction in the pixel array of the feature map in the convolutional neural network. "M" corresponds to "Feature Map Depth", which is a feature in a depth direction of the pixel in the feature map of the convolutional neural network. "C" corresponds to "Number of Classes", which is the number of classes assigned to each pixel in the annotation information. "L" corresponds to "Latent Vector Length", which is a latent vector length of the latent variable. When the annotation augmented model AEM is created, it is preferable to perform training so as to reduce cross entropy between annotation information inputted to the encoder E and the augmented annotation information outputted from the decoder D. That is, in the embodiment, the annotation augmented model AEM is trained so as to reduce the cross entropy between probability distribution of the annotation information (H, W, C) and probability distribution of the augmented annotation information (H, W, C').

Figure 14:
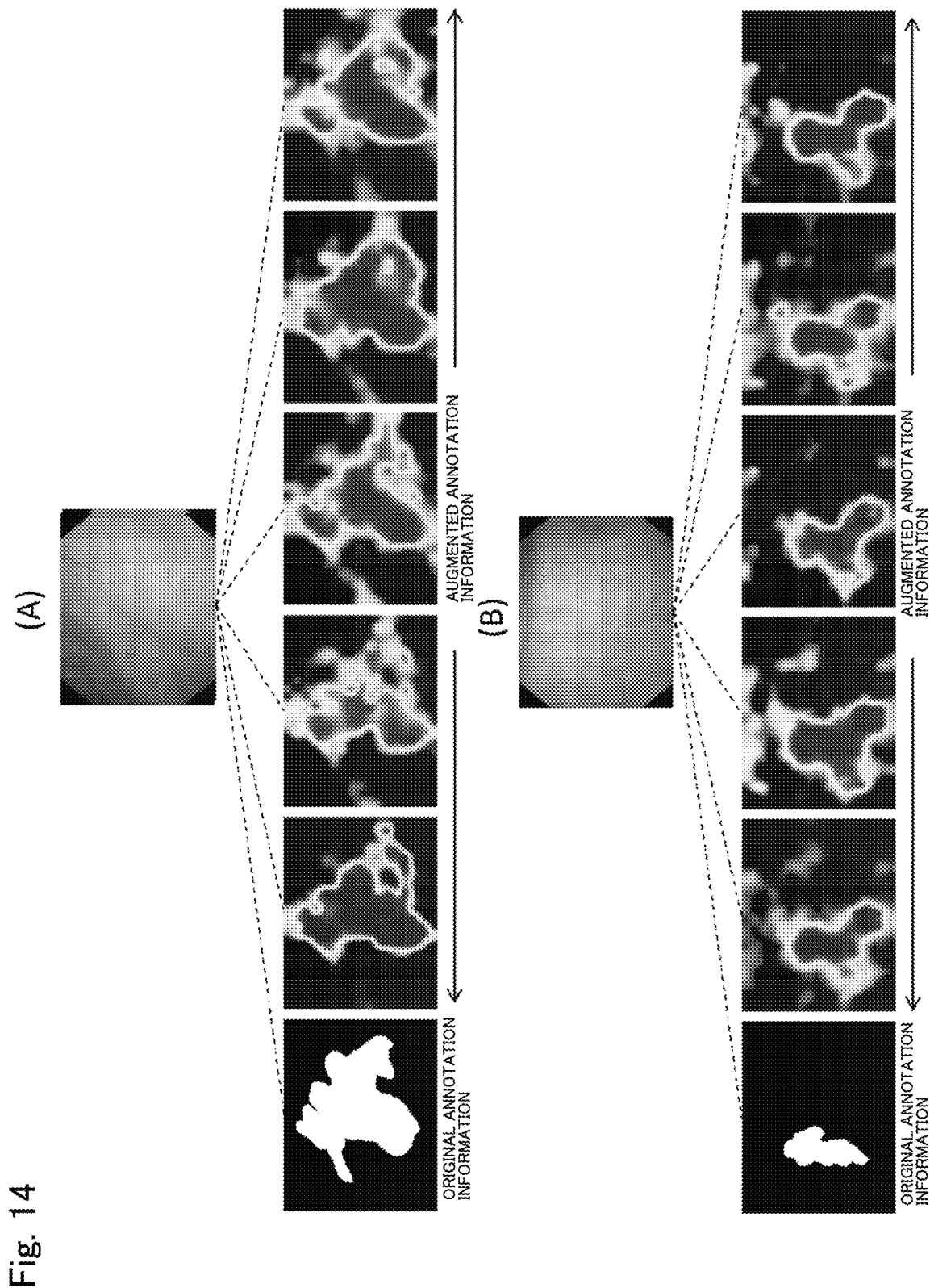
FIGS. 14(A) and (B) illustrate annotation information corresponding to bladder endoscopic images and augmented annotation information.

When the above annotation augmented model AEM is used, useful augmented annotation information can be newly obtained from the endoscopic image in the original endoscopic image database even if training data is small without increasing new annotation information and without forcing the doctor to work. It is also possible to use GAN (generative adversarial network) as the annotation augmented model AEM. In the embodiment, the annotation augmented model AEM based on VAE (variational autoencoder) using probability distribution as the latent variable is used. FIGS. 14 (A) and (B) respectively illustrate examples of a plurality of augmented annotation information generated by the trained annotation augmented model from respective endoscopic images to be targets. As can be seen in these views, a plurality of augmented annotation information close to original annotation information added by the doctor can be generated from the same endoscopic image.

It is preferable that augmented annotation information is randomly augmented in the annotation augmented model AEM. The augmented annotation information is generated in accordance with probability distribution defined by the latent variable in the trained annotation augmented model. Random autoaugmentation does not mean that all augmented annotation information is generated in accordance with probability distribution, but means that the augmented annotation information is generated by randomly selecting the latent variable. Specifically, the example of FIGS. 14 (A) and (B) means that, for example, one piece of augmented annotation information is randomly generated from five pieces of generable augmented annotation information. With this, it is possible to obtain balanced augmented annotation information without increasing augmented annotation information more than necessary. Moreover, when M-times existing data augmentation and L-times annotation augmentation are executed to N-pieces of data sets by being combined with an existing data augmentation method, the augmented data sets are augmented to L×M×N pieces of data sets.

Figure 15:
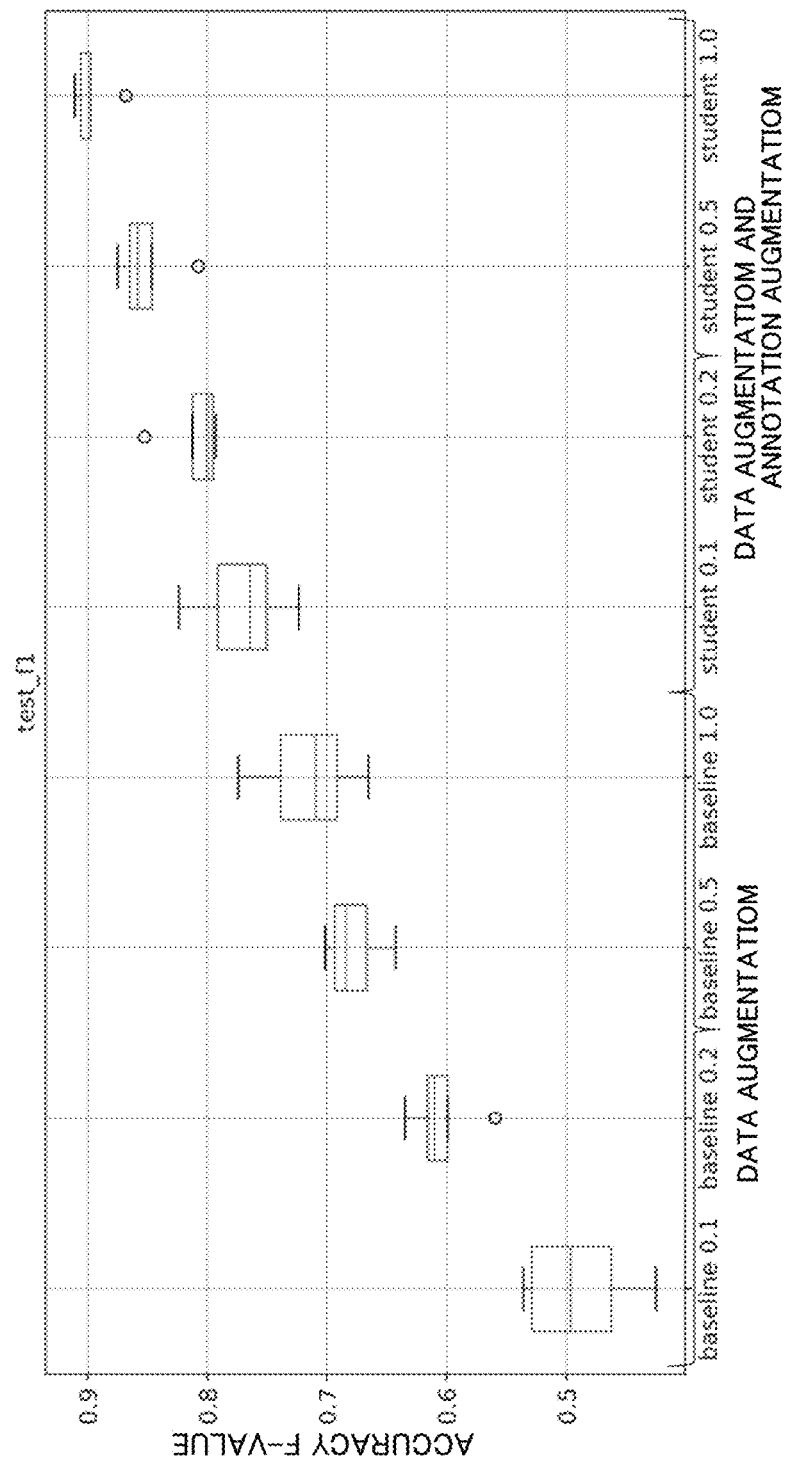
FIG. 15 is a chart comparing diagnosis accuracies before and after applying annotation augmentation

FIG. 15 illustrates diagnostic accuracy F in a case where the augmented model is trained by using training data in which augmented data augmented by using existing data augmentation is added to existing training data, and in a case where the augmented model is trained by using training data in which augmented data obtained by existing data augmentation and data obtained by annotation augmentation are added to existing training data. A horizontal axis represents the ratio of training data, in which "baseline 1.0" shows a case where augmented data obtained by the existing data augmentation is used for training with respect to 100% of training data in the endoscopic image database, and "student 1.0" shows a case where augmented data obtained by the existing data augmentation and augmented data obtained by annotation augmentation are used for training with respect to 100% of training data in the endoscopic image database. It is found, from FIG. 15, that the diagnostic accuracy F is increased in the case where annotation augmentation is used for training. Moreover, when annotation extension is performed while reducing the amount of original training data to 10%, the accuracy is better than the case where data augmentation is performed with 100% of the amount of training data; therefore, it is found that annotation augmentation method improves training accuracy with small data.

According to the embodiment, in order to improve diagnostic accuracy by effectively using limited data sets for training without increasing data for training, annotation information is newly generated not through the doctor with respect to the endoscopic image of the data sets for training by using the annotation augmented model AEM trained by the data sets for training, and the augmented annotation information is combined with original annotation information to be used as the augmented data set, thereby further increasing training accuracy of the image diagnosis model DM with small data.

[Image Diagnosis Support by Area Limited Lesion Determination]

In the image diagnosis support system executing the sixth step, diagnosis may be supported by detecting an area where the possibility of a lesion is high in the endoscopic image, and diagnosing whether the area where the possibility of the lesion is high is the lesion or not by using the trained image diagnosis model which has been trained by using data recorded in the endoscopic image database as training data. The endoscopic image contains both a part assumed to be normal and a part assumed to be a lesion. Accordingly, when diagnosing whether the normal part or the lesion by taking the area where possibility of the lesion is high as a target to be assessed, the diagnostic accuracy can be increased as compared with assessing the entire image.

Figure 16:
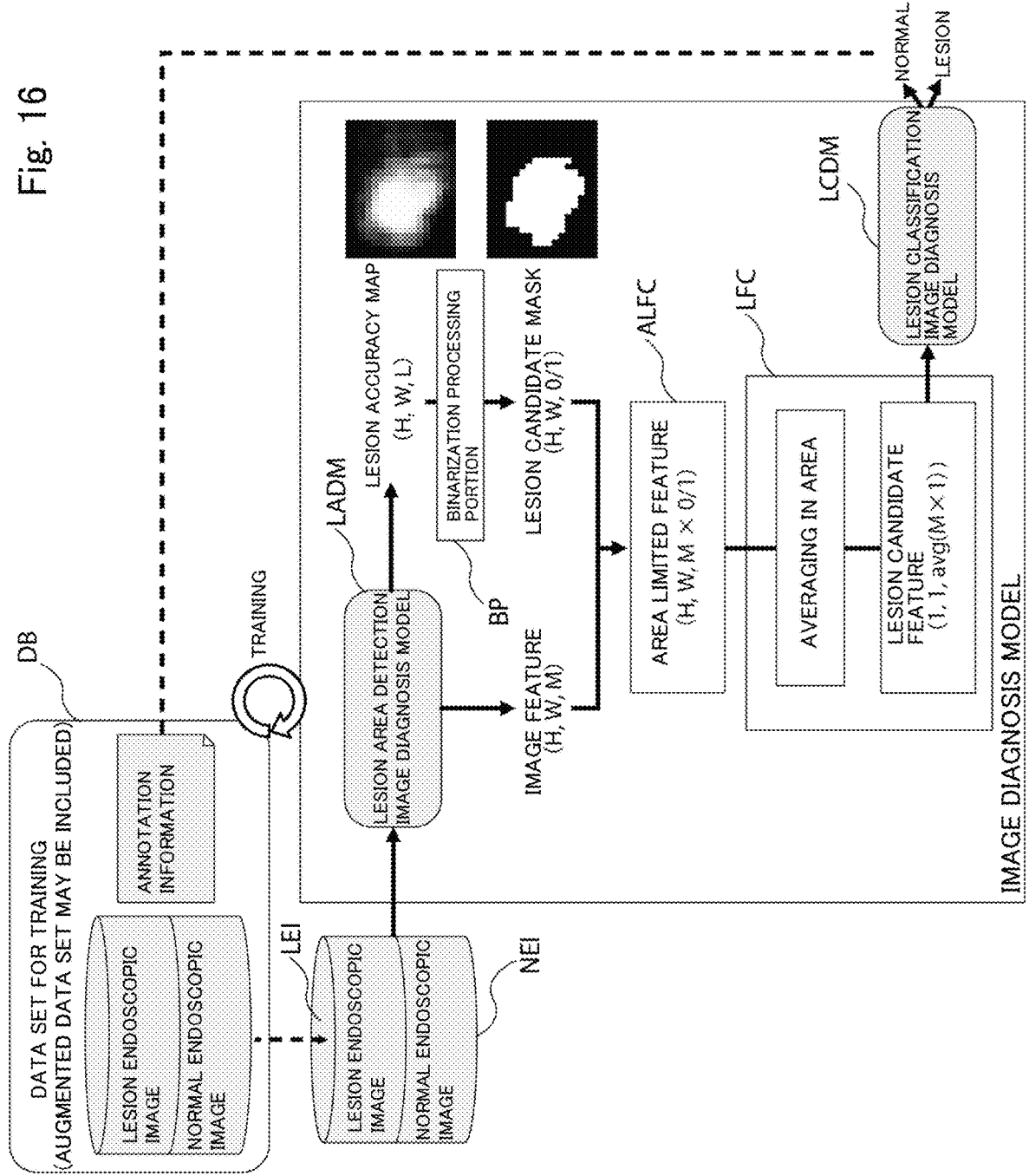
FIG. 16 illustrates a flowchart for creating a lesion classification image diagnosis model in an image diagnosis model with a limited lesion area.

FIG. 16 illustrates a specific example for creating the trained image diagnosis model for performing image diagnosis support according to area limited lesion classification (a trained lesion area detection image diagnosis model and a trained lesion classification image diagnosis model) in the sixth step. A lesion area detection image diagnosis model LADM used in FIG. 16 is an image diagnosis model for extracting the image features (H, W, M) of all pixels from the lesion endoscopic image LEI and a normal endoscopic image NEI. In this image diagnosis model, an area where the possibility of the lesion is high is specified from the endoscopic images LEI and NEI, and a feature (area limited feature: H, W, M×0/1) where the possibility of the lesion is high by using image features of a plurality of pixels in the area where the possibility of the lesion is high. Next, a lesion candidate feature (1, 1, avg (M×1)) is calculated from the area limited feature (H, W, M×0/1). The lesion candidate feature (1, 1, avg (M×1)) is an average value in an area of a part where a feature M of each pixel is "1" of a lesion candidate mask (H, W, 0/1). Then, the area where the possibility of the lesion is high is classified into the normal part and the lesion from the lesion candidate feature (1, 1, avg (M×1)) by using a lesion classification image diagnosis model LCDM.

More specifically, the image diagnosis model for creating the trained image diagnosis model for performing image diagnosis support is configured from the lesion area detection image diagnosis model LADM, a binarization processing portion BP, an area limited feature calculation portion ALFC, a lesion candidate feature calculation portion LFC, and the lesion classification image diagnosis model LCDM.

The lesion area detection image diagnosis model LADM creates a lesion accuracy map (H, W, L) from image features (H, W, M) of all pixels in one image and the endoscopic image. Note that Resnet 50 which is a convolutional neural network having 50-layers depth can be used as the lesion area detection image diagnosis model LADM. The binarization processing portion BP creates the lesion candidate mask (H, W, 0/1) by performing binarization processing to the lesion accuracy map (H, W, L). As the binarization processing portion BP, "Otus's method" which is an image binarization method can be used. The area limited feature calculation portion ALFC calculates the area limited feature (H, W, M×0/1) which is limited to the area where the possibility of the lesion is high by multiplying the image feature (H, W, M) by the lesion candidate mask (H, W, 0/1). The lesion candidate feature calculation portion LFC calculates the lesion candidate feature (1, 1, avg (M×1)) at the area where the possibility of the lesion is high by averaging parts of limited areas (M×1) of the area limited feature (H, W, M×0/1). Then, the lesion classification image diagnosis model LCDM classifies the area where the possibility of the lesion is high into the normal part and the lesion on the basis of the lesion candidate feature (1, 1, avg (M×1)). As the lesion classification image diagnosis model LCDM, a multilayer perceptron method (MLP method) provided with a softmax function (Softmax), which is an activation function can be used. In this example, the image feature (H, W, M) of each pixel is obtained from an intermediate layer of the lesion area detection image diagnosis model LADM.

In the image diagnosis support system executing the sixth step, a trained image diagnosis model using a trained lesion area detection image diagnosis model and a trained lesion classification image diagnosis model obtained by training the lesion area detection image diagnosis model LADM and the lesion classification image diagnosis model LCDM is used. When such trained image diagnosis model is used, determination accuracy at the area where the possibility of the lesion is high can be increased.

Figure 17:
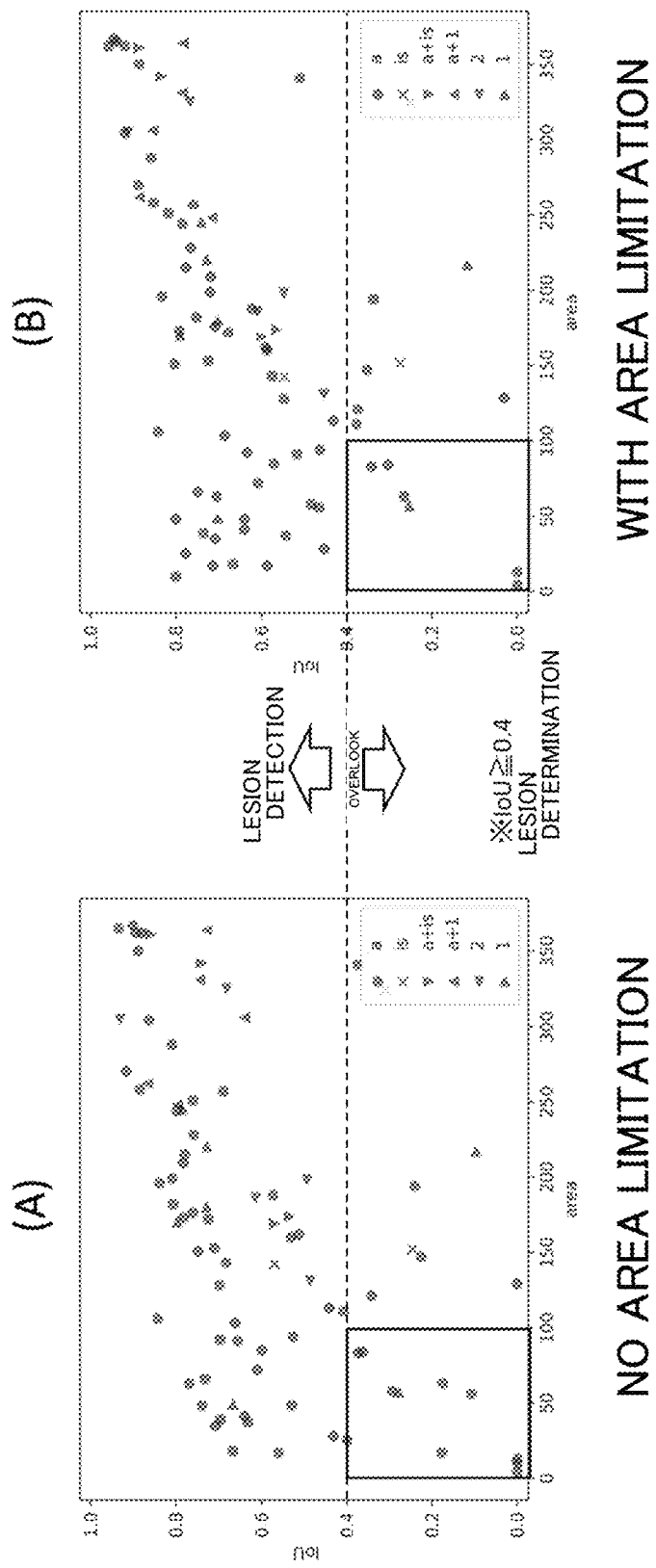
FIGS. 17(A) and (B) illustrate results of lesion classification before and after using the lesion classification image diagnosis model in the image diagnosis model with the limited lesion area.

FIGS. 17 (A) and (B) illustrate a lesion determination result in a case where the area is not limited and a lesion determination result in a case where the area is limited. In FIGS. 17 (A) and (B), the vertical axis represents the assessment index (IoU) and the horizontal axis represents the size of the lesion area. IoU≥0.4 indicates that lesion determination is correctly made, and IoU<0.4 indicate that the lesion is overlooked. When comparing FIG. 17 (A) with (B), there were 11 overlooking of minimal lesions (area: 0-100) in the case where the area is not limited; however, overlooking of minimal lesions is reduced to 6 when the area is limited. According to the above result, it is found that the determination accuracy can be increased by detecting the area where the possibility of the lesion is high in the endoscopic image and determining whether the area where the possibility of the lesion is high is the lesion or not.

[Display Screen of Display Device]

Figure 18:
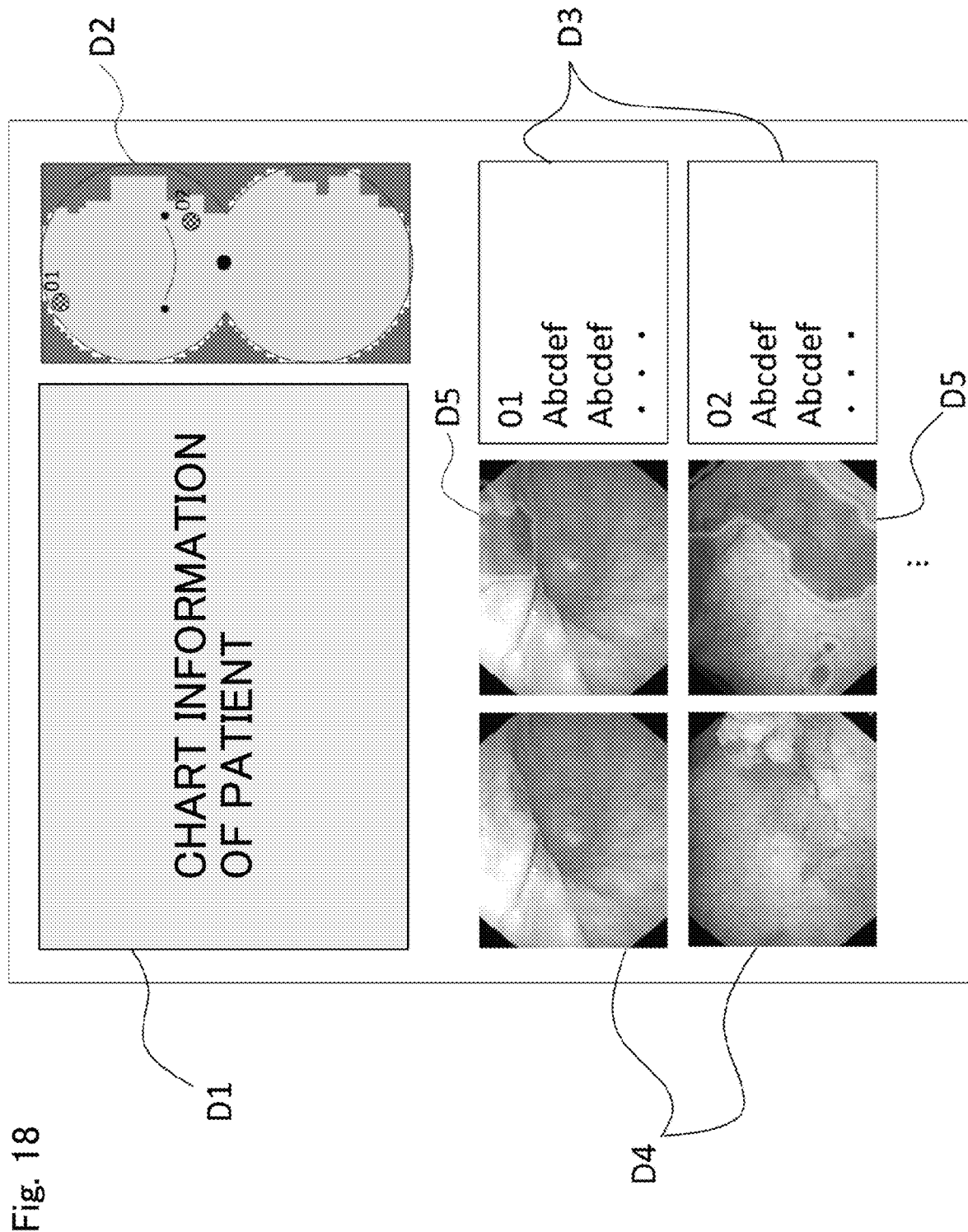
FIG. 18 illustrates an example display screen on which an observation result and a diagnosis result are displayed.

FIG. 18 illustrates an example of a display screen of a display device of the image diagnosis support system that executes the image diagnosis support method. In this example, patient's chart information D1, an observation position display D2 on which plural observed areas and positions of detected lesions are displayed on a view resembling the observation canvas, a diagnosis result display D3 on which malignancies and types of lesions in the observed areas where the lesions exist are displayed, an original endoscopic image including the lesion D4, and an endoscopic image diagnosis support image D5 obtained by superimposing a result of the image diagnosis support at the time of determining the lesion on the endoscopic image are displayed on the display screen. According to the display, the observation result and the diagnosis result can be confirmed on the display screen.

Figure 19:
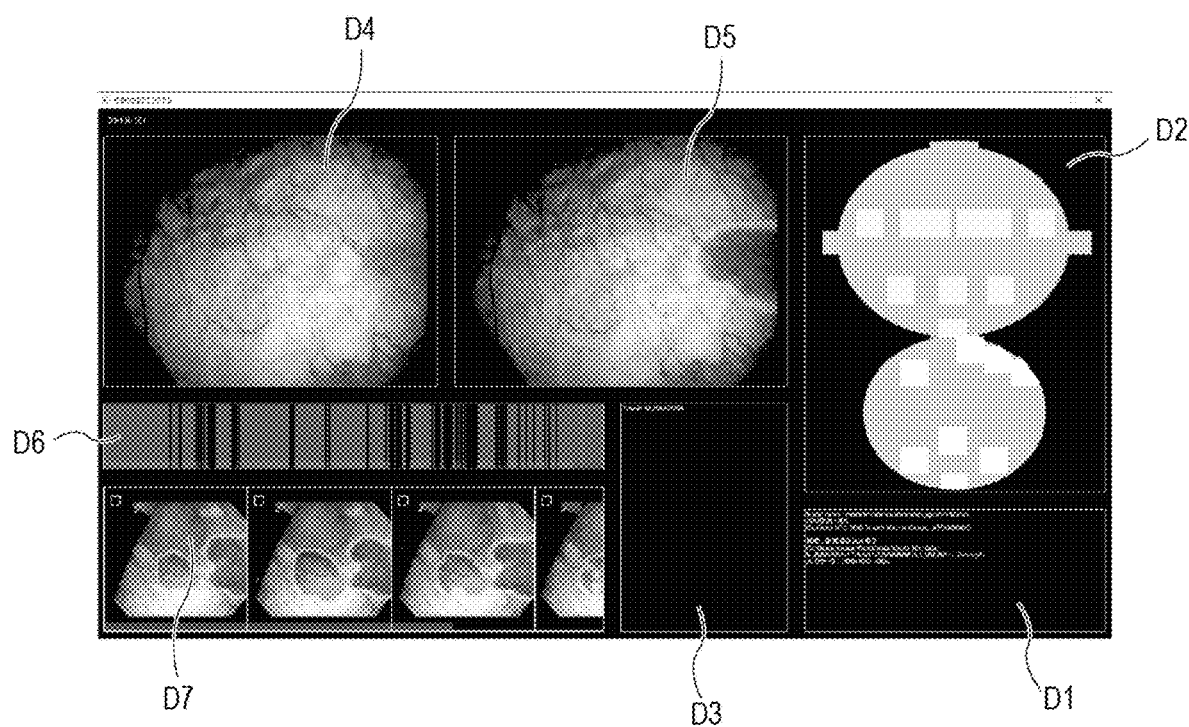
FIG. 19 illustrates another example display screen on which an observation result and a diagnosis result are displayed.
Figure 20:
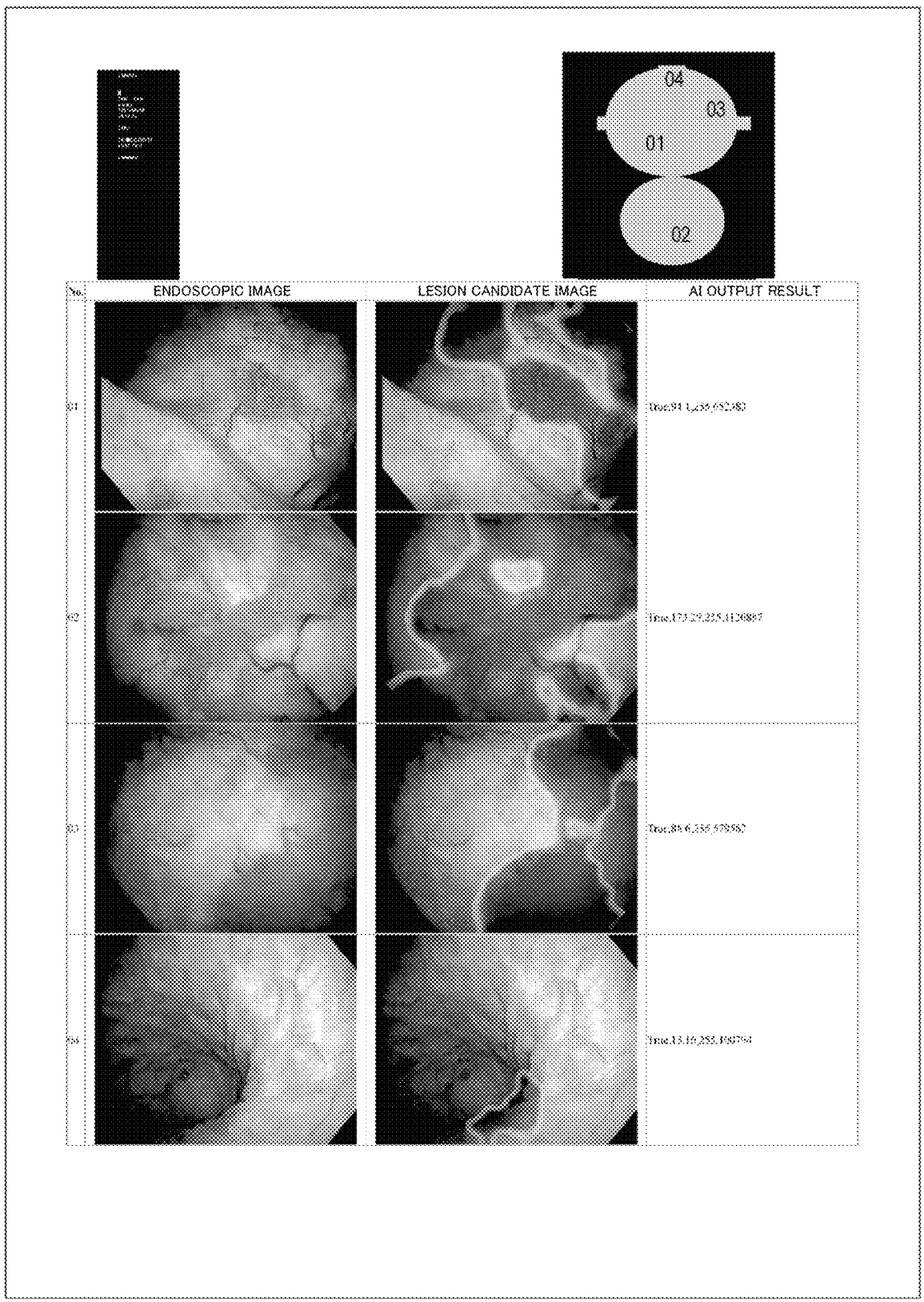
FIG. 20 illustrates an example output report.

FIG. 19 illustrates another example of the display screen of the display device. Also in this example, the patient's chart information D1, the observation position display D2 on which plural observed areas and positions of detected lesions are displayed on the view resembling the observation canvas, the diagnosis result display D3 on which malignancies and types of the observed areas where the lesions exist are displayed, the original endoscopic image including the lesion D4, and the endoscopic image diagnosis support image D5 obtained by superimposing a result of the image diagnosis support at the time of determining the lesion on the endoscopic image are displayed on the display screen. In this example, a processing status display D6 for further displaying the processing status and lesion-candidate thumbnail images D7 are further displayed. In the processing status display D6, observation time and the existence of the lesion when processing is performed are sequentially displayed. Therefore, when a vertical line in the processing status display D6 is clicked, the endoscopic image diagnosis support image at that time is displayed as the lesion-candidate thumbnail image D7. On the lesion-candidate thumbnail images D7, an image displayed on the endoscopic image diagnosis support image D5 obtained as the diagnosis result at the observation time is displayed by a thumbnail as a lesion candidate. When selecting the thumbnail, displays of D1, D2, and D3 are changed in accordance with the selected thumbnail. FIG. 20 illustrates an example output report. Images corresponding to a check state in check boxes of the lesion-candidate thumbnail images D7 in FIG. 19 are displayed. An example of the output report is not limited to the example of FIG. 20.

Constituent features of configurations of a plurality of inventions disclosed in the description of the present application will be enumerated below.

[1] An endoscopic diagnosis support system in which an imaging device provided at a tip portion of an endoscope is inserted into a cavity of an organ of a subject and the existence of a lesion in the organ is diagnosed by using a computer on the basis of a plurality of frames including an endoscopic image taken by the imaging device, wherein the computer is configured to execute a first step of preparing observation canvas data for an observation canvas of the endoscopic image of the cavity, a second step of determining a key frame containing at least one anatomical structure which can specify a position in the cavity of the organ in a frame and marking key-frame position data of the key frame in the observation canvas data, a third step of setting the key frame as the first preceding frame and determining three or more key points each existing on a preceding frame and a following frame in the plurality of frames to calculate coordinates of the key points in the endoscopic image, a fourth step of calculating a displacement amount between the preceding frame and the following frame on the basis of the coordinates of the three or more key points in the endoscopic image, a fifth step of marking determined position data of the plurality of following frames in the observation canvas data on the basis of at least the displacement amount, the first key-frame position data which has been marked first in the second step, and the next key-frame position data which has been marked later in the second step, and a sixth step of supporting image diagnosis of the existence of the lesion in the organ on the basis of the plurality of determined position data marked in the observation canvas data and the plurality of frames in parallel with or after execution of the second step to the fifth step with respect to the plural frames.

[2] The endoscopic diagnosis support system described in the above [1], wherein the computer further executes a step of displaying, on a display screen of a display device, at least one of an observation position display on which a plurality of observed areas are displayed on a view resembling the observation canvas, a lesion position display on which the plurality of observed areas where lesions exist on the view resembling the observation canvas, a diagnosis result display on which malignancies and types of lesions in the observed areas where the lesions exist are displayed, and a display of a chart of the subject.

[3] An endoscopic diagnosis support system performing support such that an imaging device provided at a tip portion of an endoscope is inserted into a cavity of an organ of a subject and the existence of a lesion in the organ is diagnosed by using a computer on the basis of a plurality of frames including an endoscopic image taken by the imaging device, wherein an area where the possibility of a lesion is high is detected in the endoscopic image and it is determined whether the area where the possibility of the lesion is high is the lesion or not by using a trained image diagnosis model obtained by training data recorded in an endoscopic image database as training data.

[4] A computer program for an endoscopic diagnosis support system for implementing the endoscopic diagnosis support system that performs support such that an imaging device provided at a tip portion of an endoscope is inserted into a cavity of an organ of a subject and the existence of a lesion in the organ is diagnosed by using a computer on the basis of a plurality of frames including an endoscopic image taken by the imaging device, wherein the computer program is recorded in a computer-readable recording medium and is installed in the computer which is configured to execute a first step of preparing observation canvas data for an observation canvas of the endoscopic image of the cavity, a second step of determining a key frame containing at least one anatomical structure which can specify a position in the cavity of the organ in a frame and marking key-frame position data of the key frame in the observation canvas data, a third step of setting the key frame as the first preceding frame and determining three or more key points each existing on a preceding frame and a following frame in a plurality of frames to calculate coordinates of the key points in the endoscopic image, a fourth step of calculating a displacement amount between the preceding frame and the following frame on the basis of the coordinates of the three or more key points in the endoscopic image, a fifth step of marking determined position data of the plurality of following frames in the observation canvas data on the basis of at least the displacement amount, the first key-frame position data which has been marked first in the second step, and the next key-frame position data which has been marked later in the second step, and a sixth step of supporting image diagnosis of the existence of the lesion in the organ on the basis of the plurality of determined position data marked in the observation canvas data and the endoscopic image in the plurality of frames in parallel with or after execution of the second step to the fifth step with respect to the plurality of frames, and a sixth step to realize at least one of a first support system performing diagnosis support by using a trained image diagnosis model obtained by training data recorded in an endoscopic image database including image data with annotation information as training data, and a second support system performing diagnosis support by detecting an area where the possibility of a lesion is high in the endoscopic image and determining whether the area where the possibility of the lesion is high is the lesion or not by using the trained image diagnosis model obtained by training data recorded in the endoscopic image database as training data.

INDUSTRIAL APPLICABILITY

According to the present invention, marking is performed with respect to observation canvas data of an inner wall of a target organ; therefore, examined areas and unexamined areas can be clearly discriminated, the inside of the target organ can be thoroughly observed, and where the captured image was taken can be correctly recorded. Moreover, it is possible to perform support at the time of image diagnosis of the existence of a lesion in the organ on the basis of the plurality of position data marked in the observation canvas data and an endoscopic image in the plurality of frames.

REFERENCE SIGNS LIST

ES: endoscopic system
EI: endoscopic image
IDS: image diagnosis support step
ORS: observation recording step
SID: diagnosis support information display portion
SOC: simulated unfolded observation canvas
MX: matrix
DB: endoscopic image database
DM: image diagnosis model
TDM: trained image diagnosis model
AEM: annotation augmented model
E: encoder
D: decoder
TADM: trained normal additional training type image diagnosis model
TDM 1: trained image diagnosis model
DM 1: image diagnosis model
TDM 2: trained image diagnosis model
LADM: lesion area detection image diagnosis model
LCDM: lesion classification image diagnosis model
BP: binarization processing portion
ALFC: area limited feature calculation portion
LFC: lesion candidate feature calculation portion
LSEDM: similar image determination model

The invention claimed is:
1. An endoscopic diagnosis support method for supporting endoscopic diagnosis by using a computer, wherein an imaging device provided at a tip portion of an endoscope is inserted into a cavity of an organ of a subject and an existence of a lesion in the organ is diagnosed by using the computer on the basis of a plurality of frames including an endoscopic image taken by the imaging device, the computer executing the steps of:

a first step of preparing observation canvas data for an observation canvas of the endoscopic image of the cavity, a second step of determining a key frame containing at least one anatomical structure which can specify a position in the cavity of the organ in a frame and marking key-frame position data of the key frame in the observation canvas data, a third step of setting the key frame as a first preceding frame and determining three or more key points each existing on a preceding frame and a following frame defined in the plurality of frames to calculate coordinates of the key points in the endoscopic image, a fourth step of calculating a displacement amount between the preceding frame and the following frame on the basis of the coordinates of the three or more key points in the endoscopic image, a fifth step of marking determined position data of the plurality of following frames in the observation canvas data on the basis of at least the displacement amount, the first key-frame position data which has been marked first in the second step, and next key-frame position data which has been marked later in the second step, and a sixth step of supporting image diagnosis of the existence of the lesion in the organ on the basis of a plurality of the determined position data marked in the observation canvas data and the endoscopic image in the plurality of frames in parallel with or after execution of the second step to the fifth step with respect to the plurality of frames.

2. The endoscopic diagnosis support method according to claim 1, wherein
position data of the following frame includes relative position information with respect to the key-frame position data and a frame number.

3. The endoscopic diagnosis support method according to claim 2, wherein
the relative position information is composed of coordinate position data attached with a sign representing a type wherein a plurality of segments of the same size and shape is assumed on the simulated unfolded observation canvas and is aligned to form a matrix, and a coordinate position of a segment in which the at least one anatomical structure is located is defined as a reference point in the matrix.

4. The endoscopic diagnosis support method according to claim 1, wherein
the observation canvas is a simulated unfolded observation canvas in which positions of a plurality of openings and top parts in the cavity of the organ are specified by common methods, and one opening is disposed at the center, and
in the fifth step, a plurality of temporary position data is used as position data of the plurality of following frames until the next key-frame position data is determined, and when the next key-frame position data is determined, the determined position data of the plurality of following frames is marked so that the plurality of temporary position data of the plurality of following frames fits between the first key-frame position data and the next key-frame position data.

5. The endoscopic diagnosis support method according to claim 1, wherein the second step and the third step are implemented by using a self-position estimation technique.

6. The endoscopic diagnosis support method according to claim 1, wherein in the sixth step, at least one of a first support method and a second support method is executed, the first support method supporting diagnosis using a trained image diagnosis model which has been trained by training data recorded as training data in an endoscopic image database including image data attached with annotation information, and the second support method supporting diagnosis by using a trained image diagnosis model which has been trained by data recorded as training data in the endoscopic image database to detect an area where the possibility of a lesion is high in the endoscopic image, and to determine whether the area where the possibility of the lesion is high is the lesion or not.

7. The endoscopic diagnosis support method according to claim 6, wherein the endoscopic image database further includes augmented annotation information obtained by augmenting annotation information by using an annotation augmented model.

8. The endoscopic diagnosis support method according to claim 7, wherein
the annotation augmented model is an annotation augmented model based on an autoencoder constituted from an encoder and a decoder, and
the annotation augmented model is trained to estimate the augmented annotation information by inputting into the encoder a set of a feature extracted from an intermediate layer of the image diagnosis model into which a lesion endoscopic image recorded in the endoscopic image database has been inputted using the image diagnosis model as a feature extractor, and the annotation information corresponding to the lesion endoscopic image, and by causing the decoder to perform inverse operation of a latent variable outputted from the encoder and the feature.

9. The endoscopic diagnosis support method according to claim 8, wherein training is performed so as to reduce cross entropy between the annotation information inputted to the encoder and the augmented annotation information.

10. The endoscopic diagnosis support method according to claim 8, wherein the annotation augmented model randomly augments the augmented annotation information.

11. The endoscopic diagnosis support method according to claim 7, wherein the endoscopic image database further includes an augmented data set containing augmented data and augmented annotation information obtained by augmenting data of the lesion endoscopic images recorded in the endoscopic image database by using a data augmentation technique.

12. The endoscopic diagnosis support method according to claim 11, wherein
the trained image diagnosis model used in the second method for supporting diagnosis is configured to extract image features in all pixels from the endoscopic image, to specify an area where the possibility of the lesion is high from the endoscopic image, to calculate a lesion candidate feature in the area where the possibility of the lesion is high by using the image features of a plurality of pixels located in the area where the possibility of the lesion is high, and to classify the area where the possibility of the lesion is high into a normal part and the lesion from the lesion candidate feature.

13. The endoscopic diagnosis support method according to claim 12, wherein the trained image diagnosis model is constituted from:
a lesion area detection image diagnosis model that creates a lesion accuracy map from the image feature and the endoscopic image, a binarization processing portion that creates a lesion candidate mask by performing binarization processing of the lesion accuracy map, an area limited feature calculation portion that calculates an area limited feature which is limited to the area where the possibility of the lesion is high on the basis of the image feature and the lesion candidate mask, a lesion candidate feature calculation portion that calculates a lesion candidate feature for the area where the possibility of the lesion is high by averaging the area limited features, and a lesion classification image diagnosis model that classifies the area where the possibility of the lesion is high into the normal part and the lesion on the basis of the lesion candidate feature.

14. The endoscopic diagnosis support method according to claim 1, wherein the computer further executes a step of displaying, on a display screen of a display device, at least one of:

observation position display that displays a plurality of observed areas on a view resembling the observation canvas, lesion position display that displays the observed areas where lesions exist on the view resembling the observation canvas, diagnosis result display that displays malignancies and types of lesions in the observed areas where the lesions exist, and display of a medical chart of the subject.

15. An endoscopic diagnosis support system provided with a computer having means for executing the endoscopic diagnosis support method according to claim 1, wherein the computer comprises:

a first means for executing a first step of preparing observation canvas data for an observation canvas of the endoscopic image of the cavity, a second means for executing a second step of determining a key frame containing at least one anatomical structure which can specify a position in the cavity of the organ in a frame and marking key-frame position data of the key frame in the observation canvas data, a third means for executing a third step of setting the key frame as a first preceding frame and determining three or more key points each existing on a preceding frame and a following frame defined in the plurality of frames to calculate coordinates of the key points in the endoscopic image, a fourth means for executing a fourth step of calculating a displacement amount between the preceding frame and the following frame on the basis of the coordinates of the three or more key points in the endoscopic image, a fifth means for executing a fifth step of marking determined position data of the plurality of following frames in the observation canvas data on the basis of at least the displacement amount, the first key-frame position data which has been marked first in the second step, and the next key-frame position data which has been marked later in the second step, and a six means for executing a sixth step of supporting image diagnosis of the existence of the lesion in the organ on the basis of the plural determined position data marked in the observation canvas data and the endoscopic image in the plurality of frames in parallel with or after execution of the second step to the fifth step with respect to the plurality of frames.

* * * * *